United States Patent
Yamada

(10) Patent No.: US 12,442,686 B2
(45) Date of Patent: Oct. 14, 2025

(54) OPTICAL DEVICE AND SPECTROSCOPY APPARATUS

(71) Applicant: SEIKO EPSON CORPORATION, Tokyo (JP)

(72) Inventor: Kohei Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 278 days.

(21) Appl. No.: 18/359,191

(22) Filed: Jul. 26, 2023

(65) Prior Publication Data

US 2024/0035889 A1 Feb. 1, 2024

(30) Foreign Application Priority Data

Jul. 27, 2022 (JP) .................................. 2022-119937

(51) Int. Cl.
  *G01J 3/28* (2006.01)
  *G01J 3/02* (2006.01)
(52) U.S. Cl.
  CPC ................. *G01J 3/28* (2013.01); *G01J 3/021* (2013.01)
(58) Field of Classification Search
  None
  See application file for complete search history.

(56) References Cited

U.S. PATENT DOCUMENTS

| | | | |
|---|---|---|---|
| 6,025,913 A | 2/2000 | Curbelo | |
| 9,829,306 B2 * | 11/2017 | Thurner | G01B 9/02007 |
| 2009/0207416 A1 * | 8/2009 | Xiangqian | G01B 9/02027 356/477 |
| 2018/0017371 A1 * | 1/2018 | Yamauchi | G02B 21/00 |
| 2019/0033136 A1 * | 1/2019 | Warashina | G01J 3/02 |
| 2020/0124472 A1 | 4/2020 | Suzuki et al. | |

FOREIGN PATENT DOCUMENTS

| | | |
|---|---|---|
| JP | S59-228133 A | 12/1984 |
| JP | 2001-517774 A | 10/2001 |
| JP | 2006-300664 A | 11/2006 |
| JP | 2014-182076 A | 9/2014 |
| JP | 2016-142527 A | 8/2016 |
| JP | 2020-129116 A | 8/2020 |

* cited by examiner

Primary Examiner — Marcus H Taningco
(74) Attorney, Agent, or Firm — Harness, Dickey & Pierce, P.L.C.

(57) ABSTRACT

An optical device includes: a first optical system; and a second optical system. The first optical system includes a first light splitting device configured to split measurement light emitted from a first light source into a first measurement light and a second measurement light and then mix the split measurement light, a first mirror configured to add a first modulation signal by being moved in an entering direction of the first measurement light and reflecting the first measurement light, a second mirror configured to reflect the second measurement light, and a first light receiving device configured to receive the measurement light including a sample-derived signal and the first modulation signal and output a first light receiving signal. The second optical system includes a second light source configured to emit laser light, an optical modulator configured to add a second modulation signal to the laser light, and a second light receiving device configured to receive the laser light including a displacement signal generated by reflection on the first mirror and the second modulation signal and output a second light receiving signal.

17 Claims, 15 Drawing Sheets

OPTICAL DEVICE AND SPECTROSCOPY APPARATUS

The present application is based on, and claims priority from JP Application Serial Number 2022-119937, filed Jul. 27, 2022, the disclosure of which is hereby incorporated by reference herein in its entirety.

BACKGROUND

1. Technical Field

The present disclosure relates to an optical device and a spectroscopy apparatus.

2. Related Art

JP-A-2020-129116 describes an optical device used for spectroscopic analysis in which spectral information on light emitted from or absorbed by a sample is acquired and a component or the like in the sample is analyzed based on the spectral information. The optical device includes a mirror unit, a beam splitter unit, a first photodetector, a second light source, and a second photodetector. The mirror unit includes a movable mirror that moves in a predetermined direction and a fixed mirror whose position is fixed. In such an optical device, the beam splitter unit, the movable mirror, and the fixed mirror constitute an interference optical system in which measurement light and laser light separately enter.

The measurement light emitted from the first light source and passing through an object to be measured is split by the beam splitter unit. A part of the split measurement light is reflected by the movable mirror and returns to the beam splitter unit. A remaining part of the split measurement light is reflected by the fixed mirror and returns to the beam splitter unit. The part and the remaining part of the measurement light returned to the beam splitter unit are detected as interference light by the first photodetector.

On the other hand, the laser light emitted from the second light source is split by the beam splitter unit. A part of the split laser light is reflected by the movable mirror and returns to the beam splitter unit. A remaining part of the split laser light is reflected by the fixed mirror and returns to the beam splitter unit. The part and the remaining part of the laser light returned to the beam splitter unit are detected as interference light by the second photodetector.

In such an optical device, a position of the movable mirror can be measured based on a detection result of the interference light of the laser light. Based on a measurement result of the position of the movable mirror and a detection result of the interference light of the measurement light, spectroscopic analysis can be performed on the object to be measured. Specifically, a waveform called an interferogram is obtained by obtaining an intensity of the measurement light at respective positions of the movable mirror. By performing Fourier transforming on the interferogram, spectral information on the object to be measured can be obtained.

In the optical device described in JP-A-2020-129116, the position of the movable mirror can be detected based on an intensity change of the interference light of the laser light. Specifically, when the intensity of the interference light of the laser light takes a feature point such as a maximum value or a minimum value, the position of the movable mirror is specified based on the feature point.

However, an interval between the feature points is restricted to depend on a wavelength of the laser light, and the minimum interval is ¼ of the wavelength. Therefore, when the intensity change of the laser light is used as a trigger, it is difficult to sample the intensity of the measurement light at sufficiently short intervals. When a sampling interval of the intensity of the measurement light cannot be reduced, resolution of the interferogram cannot be sufficiently enhanced. As a result, resolution of the spectral information subjected to Fourier transforming cannot be sufficiently enhanced.

The sampling interval of the intensity of the measurement light affects a range of wavenumbers and wavelengths from which spectral information can be obtained. Therefore, it is not possible to sufficiently widen a band of the measurement light, such as correspondence with short-wavelength measurement light.

SUMMARY

An optical device according to an application example of the present disclosure includes: a first optical system; and a second optical system. The first optical system includes a first light splitting device configured to split measurement light emitted from a first light source into one and the other one and then mix the first measurement light and the second measurement light, a first mirror configured to add a first modulation signal to the first measurement light by being moved with respect to the first light splitting device in an entering direction of the first measurement light and reflecting the first measurement light, a second mirror configured to reflect the second measurement light, and a first light receiving device configured to receive the measurement light including a sample-derived signal derived from a sample and the first modulation signal and output a first light receiving signal. The second optical system includes a second light source configured to emit laser light, an optical modulator configured to add a second modulation signal to the laser light, and a second light receiving device configured to receive the laser light including a displacement signal generated by reflection on the first mirror and the second modulation signal and output a second light receiving signal.

A spectroscopy apparatus according to an application example of the present disclosure includes: the optical device according to the application example of the present disclosure; a signal generator configured to output the drive signal and a reference signal; a movable mirror position calculation unit configured to generate a movable mirror position signal indicating a position of the first mirror by performing a calculation on the second light receiving signal based on the reference signal; a measurement light intensity calculator configured to generate a waveform representing an intensity of the first light receiving signal at respective positions of the first mirror based on the first light receiving signal and the movable mirror position signal; and a Fourier transformer configured to perform Fourier transforming on the waveform to acquire spectral information.

DESCRIPTION OF EMBODIMENTS

Hereinafter, an optical device and a spectroscopy apparatus according to the present disclosure will be described in detail based on embodiments illustrated in the accompanying drawings.

1. First Embodiment

First, an optical device and a spectroscopy apparatus according to a first embodiment will be described.

Figure 1:
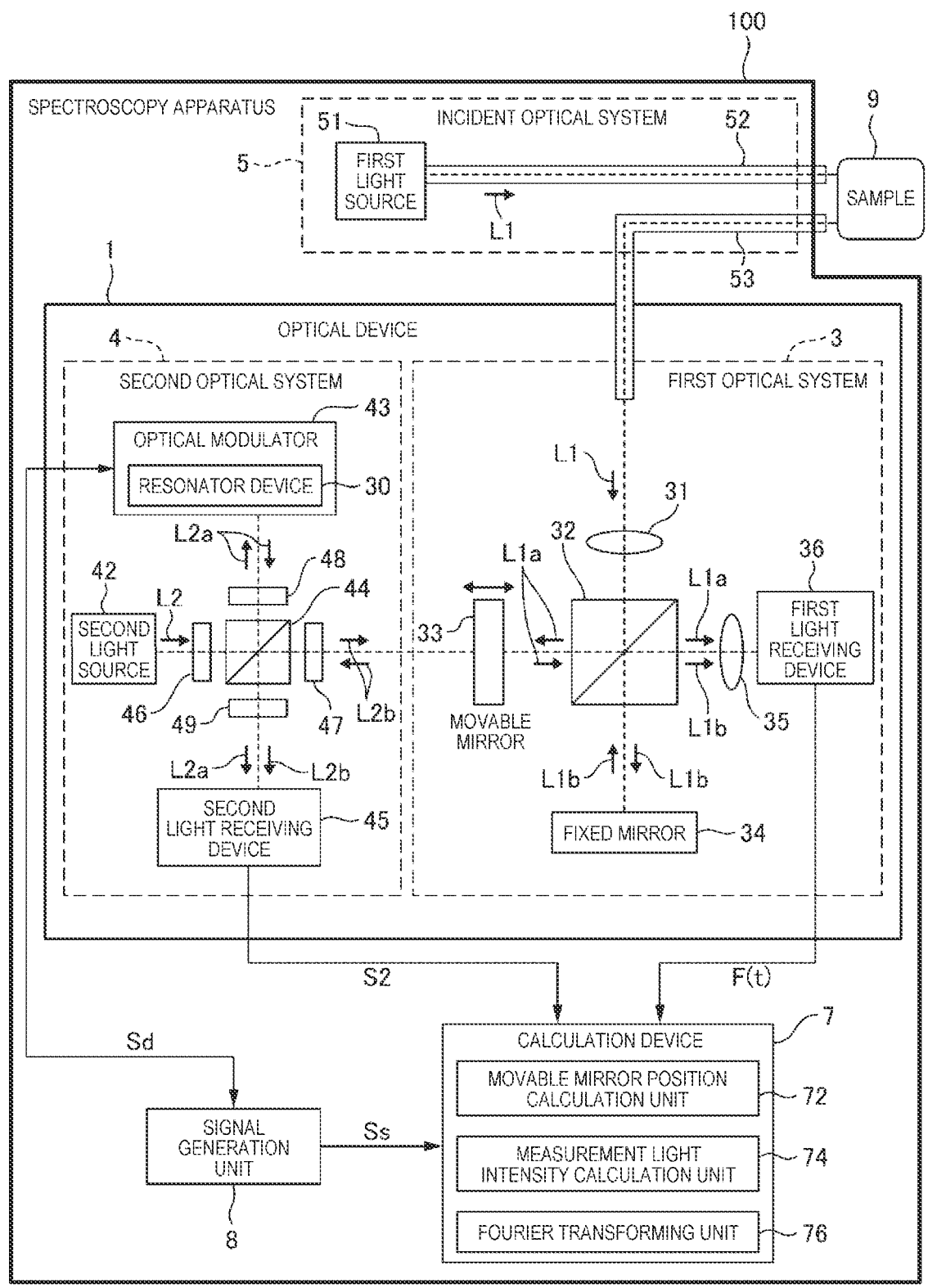
FIG. 1 is a schematic configuration diagram showing a schematic configuration of a spectroscopy apparatus according to a first embodiment.

FIG. 1 is a schematic configuration diagram showing a schematic configuration of a spectroscopy apparatus 100 according to the first embodiment.

In the spectroscopy apparatus 100 shown in FIG. 1, an interferogram is acquired by irradiating a sample 9, which is a test object, with entering measurement light L1, causing the measurement light L1 emitted from the sample 9 to pass through a Michelson type interference optical system, and detecting an intensity change of the obtained interference light. Spectral information is obtained by Fourier transforming the obtained interferogram. By selecting a wavelength of the measurement light L1, the spectroscopy apparatus 100 shown in FIG. 1 can be applied to, for example, infrared spectroscopic analysis, visible light spectroscopic analysis, ultraviolet spectroscopic analysis, and the like for the sample 9.

The spectroscopy apparatus 100 includes an optical device 1, a signal generator 8, and a calculation device 7.

The measurement light L1 emitted from the sample 9 enters the optical device 1 via an incident optical system 5. The optical device 1 shown in FIG. 1 includes a first optical system 3 that acquires an intensity of interference light, and a second optical system 4 that measures a position of a movable mirror 33 (a first mirror) provided in the first optical system 3 by laser interferometry. In the optical device 1 shown in FIG. 1, after the measurement light L1 is divided into two light beams, one light is reflected by the movable mirror 33, and the other one light is reflected by a fixed mirror 34 (a second mirror) provided in the first optical system 3. Then, the reflected light is mixed again, and an intensity of the obtained interference light is acquired.

The signal generator 8 has a function of outputting a drive signal Sd to an optical modulator 43 provided in the second optical system 4 and a function of outputting a reference signal Ss to the calculation device 7.

The calculation device 7 has a function of obtaining a waveform representing an intensity of the interference light at respective positions of the movable mirror 33, that is, an interferogram, based on a signal representing an intensity of the interference light output from the first optical system 3 and a signal representing a position of the movable mirror 33 output from the second optical system 4, and a function of performing Fourier transforming on the waveform to acquire spectral information.

The spectroscopy apparatus 100 includes the incident optical system 5. The incident optical system 5 has a function of irradiating the sample 9 with the measurement light L1 and a function of causing the measurement light L1 emitted from the sample 9 to enter the optical device 1.

Hereinafter, configurations of units of the spectroscopy apparatus 100 will be sequentially described.

1.1. Incident Optical System

The incident optical system 5 shown in FIG. 1 includes a first light source 51 and optical fibers 52 and 53.

The first light source 51 is a light source that emits, for example, white light, that is, light obtained by gathering light having a wide wavelength as the measurement light L1. A wavelength range of the measurement light L1, that is, the type of the first light source 51 is appropriately selected according to the purpose of spectroscopic analysis performed on the sample 9. When performing the infrared spectroscopic analysis, examples of the first light source 51 include a halogen lamp, an infrared lamp, and a tungsten lamp. When performing the visible light spectroscopic analysis, examples of the first light source 51 include a halogen lamp. When performing the ultraviolet spectroscopic analysis, examples of the first light source 51 include a deuterium lamp and an ultraviolet light emitting diode (UV-LED).

By selecting a wavelength of 100 nm or more and less than 760 nm as the wavelength of the measurement light L1, the spectroscopy apparatus 100 capable of performing the ultraviolet spectroscopic analysis or the visible light spectroscopic analysis can be implemented. By selecting a wavelength of 760 nm or more and 20 μm or less as the wavelength of the measurement light L1, the spectroscopy apparatus 100 capable of performing the infrared spectroscopic analysis or near-infrared spectroscopic analysis can be implemented. Further, by selecting a wavelength of 30 μm or more and 3 mm or less as the wavelength of the measurement light L1, the spectroscopy apparatus 100 capable of performing terahertz wave spectroscopic analysis can be implemented.

The optical fiber 52 guides the measurement light L1 emitted from the first light source 51 and irradiates the sample 9 with the measurement light L1. The optical fiber 53 receives the measurement light L1 emitted from the sample 9 and guides the measurement light L1 to the optical device 1. Constituent materials of the optical fibers 52 and 53 are appropriately selected according to the wavelength range of the measurement light L1. The "measurement light" in the present description refers to light emitted from the first light source 51, light emitted by an action between light emitted from the first light source 51 and the sample 9 when the sample 9 is irradiated with the light, or interference light between split measurement light beams. Among them, examples of the light emitted from the sample 9 include reflected light or transmitted light that is subjected to absorption in the sample 9 after being radiated onto the sample 9, Raman scattered light that is emitted from the sample 9 due to Raman scattering after being radiated onto the sample 9, and fluorescence that is emitted from the sample 9 after being radiated onto the sample 9.

Although the incident optical system 5 has been described above, an arrangement of the sample 9 is not limited to the arrangement shown in FIG. 1. As will be described later, for example, the sample 9 may be between a beam splitter provided in the first optical system 3 and a first light receiving device. A configuration of the incident optical system 5 is not limited to the configuration described above, and for example, the optical fibers 52 and 53 may be replaced with other optical elements. Further, a whole or a part of the incident optical system 5 may be provided in the optical device 1 to be described later.

1.2. Optical Device

The optical device 1 shown in FIG. 1 includes the first optical system 3 and the second optical system 4.

1.2.1. First Optical System

The first optical system 3 shown in FIG. 1 is a Michelson type interference optical system, and includes a collimator lens 31, a beam splitter 32 (a first light splitting device), the movable mirror 33, a fixed mirror 34, a condenser lens 35, and a first light receiving device 36. The collimator lens 31 and the condenser lens 35 may be provided as necessary, and may be omitted. The first optical system 3 may include optical elements other than those described above, or the optical elements described above may be replaced with other optical elements having equivalent functions.

The collimator lens 31 converts the measurement light L1 emitted from the incident optical system 5 into parallel light.

The beam splitter 32 is a non-polarization type beam splitter that splits the measurement light L1 into two light beams, that is, measurement light L1a and measurement light L1b. Specifically, the beam splitter 32 splits the measurement light L1 into two light beams by reflecting a part of the measurement light L1 toward the movable mirror 33 as the measurement light L1a and transmitting the other part of the measurement light L1 toward the fixed mirror 34 as the measurement light L1b.

Examples of the beam splitter 32 include a prism type device (a cubic type device) shown in FIG. 1, a plate type device, and a stacked type device. When the plate type beam splitter 32 is used, wavelength dispersion occurs between the measurement light L1a and the measurement light L1b. Therefore, a wavelength dispersion compensation plate is provided between the beam splitter 32 and the fixed mirror 34 as necessary. The wavelength dispersion compensation plate is an optical element that compensates for wavelength dispersion caused by an optical path length difference of a glass material. In the embodiment, since a prism type device is used as the beam splitter 32, the wavelength dispersion compensation plate is unnecessary. The prism type device is a device in which an optical thin film is sandwiched between prisms. The stacked type device is a device in which an optical thin film is sandwiched between two transparent flat plates. In the stacked type device, similar to the prism type device, the wavelength dispersion compensation plate can be omitted. Since the optical thin film is not exposed in the prism type device or the stacked type device, long-term reliability of the beam splitter 32 can be improved.

The beam splitter 32 transmits the measurement light L1a reflected by the movable mirror 33 toward the first light receiving device 36, and reflects the measurement light L1b reflected by the fixed mirror 34 toward the first light receiving device 36. Accordingly, the beam splitter 32 has a function of mixing the split measurement light L1a and measurement light L1b.

The movable mirror 33 is a mirror that is moved with respect to the beam splitter 32 in an entering direction of the measurement light L1a and reflects the measurement light L1a. The measurement light L1a reflected by the movable mirror 33 includes a displacement signal corresponding to the position of the movable mirror 33. The movable mirror 33 adds a first modulation signal to the measurement light L1a.

A moving mechanism (not shown) for moving the movable mirror 33 is not particularly limited, and examples thereof include a uniaxial linear stage, a piezo driving device, and a micro actuator using a micro electro mechanical system (MEMS) technique. Among them, the uniaxial linear stage includes, for example, a voice coil motor (VCM) or a ball screw drive unit and a linear guide mechanism, so that good translation in moving the movable mirror 33 can be implemented.

The fixed mirror 34 is a mirror whose position is fixed with respect to the beam splitter 32 and that reflects the measurement light L1b. The measurement light L1b reflected by the fixed mirror 34 and mixed with the measurement light L1a by the beam splitter 32 is received by the first light receiving device 36 as interference light. In the first optical system 3, an optical path difference occurs between an optical path of the measurement light L1a and an optical path of the measurement light L1b according to the position of the movable mirror 33. Therefore, an interference state of the interference light changes according to the position of the movable mirror 33.

The movable mirror 33 and the fixed mirror 34 may each be a flat-plate mirror or a corner cube mirror. A metal coat using a metal such as Al, Au, or Ag, a dielectric multilayer film, or the like may be formed on a reflective surface of each mirror. For the movable mirror 33, "moves in an entering direction of the measurement light" includes moving in a direction including a component of the entering direction of the measurement light. Accordingly, the movable mirror 33 may move in a direction (a non-parallel direction) inclined obliquely with respect to the entering direction. In this case, the calculation device 7 should have a function of removing an influence of the tilt of the movable mirror 33 with respect to the entering direction of the measurement light. Further, the fixed mirror 34 may also be configured to move. In this case, the calculation device 7 should have a function of removing the influence of the movement of the fixed mirror 34.

The condenser lens 35 condenses, to the first light receiving device 36, the interference light, that is, the mixed measurement light L1a and measurement light L1b.

The first light receiving device 36 receives the interference light and acquires an intensity thereof. A signal corresponding to the intensity is output as a first light receiving signal F(t). The first light receiving signal F(t) is a signal including the first modulation signal described above and a sample-derived signal generated by an interaction between the measurement light L1 and the sample 9. The sample-derived signal refers to a waveform change of the first light receiving signal F(t) that indicates absorption or the like of light having a specific wavelength due to interaction with the sample 9. The first modulation signal refers to a waveform change of the first light receiving signal F(t) caused by the movement of the movable mirror 33.

Examples of the first light receiving device 36 include a photodiode and a phototransistor. Among them, examples of the photodiode include an InGaAs-based photodiode, a Si-based photodiode, and an avalanche type photodiode.

1.2.2. Second Optical System

The second optical system 4 shown in FIG. 1 is a Michelson type interference optical system, and includes a second light source 42, the optical modulator 43, a beam splitter 44 (a second light splitting device), a second light receiving device 45, a half-wavelength plate 46, a quarter-wavelength plate 47, a quarter-wavelength plate 48, and an analyzer 49. The second optical system 4 may include optical elements other than those described above, such as a collimator lens, a condenser lens, and an aperture. The optical elements may be replaced with other optical elements having equivalent functions.

The second light source 42 is a light source that emits coherent laser light L2. Examples of the second light source 42 include a gas laser such as an He—Ne laser, and a semiconductor laser device such as a distributed feedback-laser diode (DFB-LD), a fiber bragg grating laser diode (FBG-LD), a vertical cavity surface emitting laser (VCSEL) diode, and a fabry-perot laser diode (FP-LD).

The second light source 42 is particularly preferably a semiconductor laser device. Accordingly, the size of the second light source 42 can be particularly reduced, and the size and weight of the optical device 1 can be reduced.

The optical modulator 43 is a frequency shifter type optical modulator, and includes a resonator device 30 that vibrates based on a drive signal. The optical modulator 43 will be described later.

The beam splitter 44 is a polarization type beam splitter that transmits P-polarized light and reflects S-polarized light. When the laser light L2 passes through the half-wavelength plate 46, the laser light L2 becomes linearly polarized light including P-polarized light and S-polarized light, and is split, by the beam splitter 44, into two light beams including the P-polarized light and the S-polarized light. Laser light L2a, which is the S-polarized light, is converted into circularly polarized light by the quarter-wavelength plate 48, and enters the optical modulator 43. The optical modulator 43 shifts a frequency by reflecting the laser light L2a. Accordingly, the optical modulator 43 adds a second modulation signal to the laser light L2a. The laser light L2a reflected by the optical modulator 43 returns to the beam splitter 44. At this time, the laser light L2a is converted into the P-polarized light by the quarter-wavelength plate 48. Laser light L2b, which is the P-polarized light, is converted into circularly polarized light by the quarter-wavelength plate 47, and enters the movable mirror 33. The movable mirror 33 reflects the laser light L2b. Accordingly, the movable mirror 33 adds a displacement signal corresponding to the position of the movable mirror 33 to the laser light L2b. The laser light L2b reflected by the movable mirror 33 returns to the beam splitter 44. At this time, the laser light L2b is converted into the S-polarized light by the quarter-wavelength plate 47.

The beam splitter 44 transmits the laser light L2a reflected by the optical modulator 43 toward the second light receiving device 45, and reflects the laser light L2b reflected by the movable mirror 33 toward the second light receiving device 45. Accordingly, the beam splitter 44 has a function of mixing the split laser light L2a and laser light L2b. The mixed laser light L2a and laser light L2b pass through the analyzer 49 and enter the second light receiving device 45.

Examples of the resonator device 30 provided in the optical modulator 43 include a crystal resonator, a silicon resonator, a ceramic resonator, and a piezo device. Among them, the resonator device 30 is preferably a crystal resonator, a silicon resonator, or a ceramic resonator. Unlike other resonators such as a piezo device, the resonators are each a resonator using a resonance phenomenon, and thus have a high Q value and can easily stabilize a natural frequency.

The optical modulator 43 including the resonator device 30 can be greatly reduced in volume and weight compared to an optical modulator in the related art. Therefore, the size, weight, and power consumption of the optical device 1 can be reduced.

Examples of the optical modulator 43 include an optical modulator disclosed in JP-A-2022-38156. This publication describes a crystal AT resonator as the resonator device 30. As the resonator device 30, an SC cut crystal resonator, a tuning-fork type crystal resonator, a crystal surface acoustic wave device, or the like may be used.

The silicon resonator is a resonator including a piezoelectric film and a single crystal silicon piece manufactured from a single crystal silicon substrate by using a micro electro mechanical system (MEMS) technique. The MEMS refers to a micro electro mechanical system. Examples of a shape of the single crystal silicon piece include a cantilever beam shape of a two-legged tuning-fork type and a three-legged tuning-fork type, and a both-ends-supported beam shape. An oscillation frequency of the silicon resonator is, for example, about 1 kHz to several hundreds of MHz.

The ceramic resonator is a resonator including an electrode and a piezoelectric ceramic piece manufactured by sintering a piezoelectric ceramic. Examples of the piezoelectric ceramic include lead zirconate titanate (PZT) and barium titanate (BTO). An oscillation frequency of the ceramic resonator is, for example, about several hundreds of kHz to several tens of MHz.

The second light receiving device 45 receives the mixed laser light L2a and laser light L2b as interference laser light, and acquires an intensity thereof. A signal corresponding to the intensity is output as a second light receiving signal S2. The second light receiving signal S2 is a signal including a displacement signal of the movable mirror 33 and the second modulation signal described above. The displacement signal refers to a waveform change added to the second light receiving signal S2 according to the position of the movable mirror 33. The second modulation signal refers to a waveform change of the second light receiving signal S2 caused by vibration or the like of the resonator device 30 provided in the optical modulator 43.

Examples of the second light receiving device 45 include a photodiode and a phototransistor.

The second optical system 4 is not limited to the above configuration. For example, the second optical system 4 may be configured such that one of the split laser light enters the second light receiving device and the other one of the split laser light enters the second light receiving device via the optical modulator and the movable mirror. The laser light L2 may be reflected by a diffraction grating, a reflection film, or the like attached to the resonator device 30, and in the present description, such a case is also included in "reflection by the resonator device 30".

The first optical system 3 and the second optical system 4 have been described above, and it is preferable that among the optical elements provided in the first optical system 3 and the second optical system 4, the optical elements that require light to enter are subjected to antireflection treatment. Accordingly, a signal-to-noise ratio (S/N ratio) of the first light receiving signal F(t) and the second light receiving signal S2 can be increased.

1.3. Signal Generator

The signal generator 8 shown in FIG. 1 outputs the drive signal Sd input to the optical modulator 43 and the reference signal Ss input to the calculation device 7.

Figure 2:
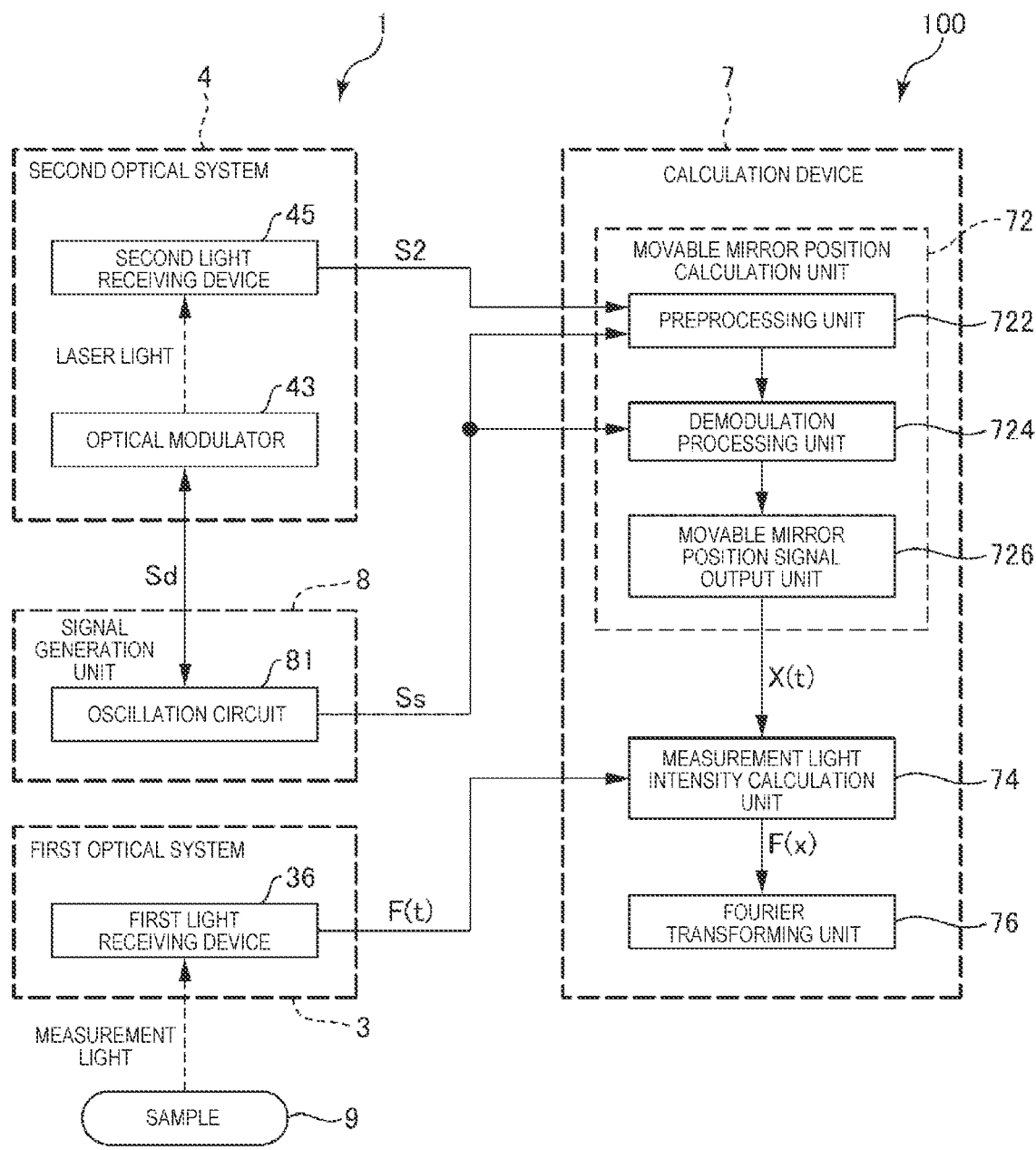
FIG. 2 is a schematic diagram showing main parts of a first optical system, a second optical system, a signal generator, and a calculation device in FIG. 1.

FIG. 2 is a schematic diagram showing main parts of the first optical system 3, the second optical system 4, the signal generator 8, and the calculation device 7 in FIG. 1.

In the embodiment, as shown in FIG. 2, the signal generator 8 includes an oscillation circuit 81. The oscillation circuit 81 operates using the resonator device 30 as a signal source, and generates a highly accurate periodic signal. The spectroscopy apparatus 100 outputs the periodic signal generated by the oscillation circuit 81 as the drive signal Sd and the reference signal Ss. Accordingly, the drive signal Sd and the reference signal Ss are affected in the same way when subjected to disturbance. Then, the reference signal Ss and the second modulation signal added via the optical modulator 43 that is driven based on the drive signal Sd are also affected in the same way. Therefore, when the displacement signal and the reference signal Ss are subjected to calculation in the calculation device 7, the influence of disturbance included in both can be balanced out or reduced in the process of calculation. As a result, the calculation device 7 can accurately determine the position of the movable mirror 33 even when subjected to disturbance.

Examples of the oscillation circuit 81 include an oscillation circuit disclosed in JP-A-2022-38156.

1.4. Calculation Device

The calculation device 7 shown in FIGS. 1 and 2 includes a movable mirror position calculation unit 72, a measurement light intensity calculator 74, and a Fourier transformer 76. Functions of these functional units are implemented by, for example, hardware including a processor, a memory, an external interface, an input unit, a display unit, and the like. Specifically, the processor reads and executes a program stored in the memory, thereby implementing the functions. These components can communicate with one another via an internal bus.

Examples of the processor include a central processing unit (CPU) and a digital signal processor (DSP). Instead of a method in which the processor executes software, a method in which a field-programmable gate array (FPGA), an application specific integrated circuit (ASIC), or the like implements the above-described functions may be adopted.

Examples of the memory include a hard disk drive (HDD), a solid state drive (SSD), an electrically erasable programmable read-only memory (EEPROM), a read-only memory (ROM), and a random access memory (RAM).

Examples of the external interface include a digital input and output port such as a universal serial bus (USB), and an Ethernet (registered trademark) port.

Examples of the input unit include various input devices such as a keyboard, a mouse, a touch panel, and a touch pad. Examples of the display unit include a liquid crystal display panel and an organic electro luminescence (EL) display panel.

The external interface, the input unit, and the display unit may be provided as necessary, and may be omitted.

1.4.1. Movable Mirror Position Calculation Unit

The movable mirror position calculation unit 72 performs a calculation on the second light receiving signal S2 based on the reference signal Ss output from the signal generator 8. Accordingly, a movable mirror position signal X(t) indicating the position of the movable mirror 33 is generated. That is, the movable mirror position calculation unit 72 specifies the position of the movable mirror 33 by a laser interferometer technique, and generates the movable mirror position signal X(t) based on the result. Specifically, the position of the movable mirror 33 is calculated by causing two light beams (the laser light L2a and the laser light L2b) having slightly different frequencies to interfere with each other and extracting phase information from the interference light. Such a method is called an optical heterodyne interferometry. According to the optical heterodyne interferometry, when specifying the position of the movable mirror 33 from the phase information of the interference light, the optical device 1 is less susceptible to disturbance, especially stray light having a frequency that causes noise, and thus provides high robustness.

The movable mirror position calculation unit 72 shown in FIG. 2 includes a preprocessing unit 722, a demodulation processing unit 724, and a movable mirror position signal output unit 726. As the preprocessing unit 722 and the demodulation processing unit 724, for example, a preprocessing unit and a demodulation unit disclosed in JP2022-38156A can be applied.

The preprocessing unit 722 performs preprocessing on the second light receiving signal S2 based on the reference signal Ss. The demodulation processing unit 724 demodulates, based on the reference signal Ss, the displacement signal corresponding to the position of the movable mirror 33 from the preprocessed signal S(t) output from the preprocessing unit 722.

The movable mirror position signal output unit 726 generates and outputs the movable mirror position signal X(t) based on the displacement signal of the movable mirror 33 demodulated by the demodulation processing unit 724. Since the movable mirror 33 reciprocates, for example, along the entering direction of the measurement light L1a, the movable mirror position signal X(t) is a signal representing the position of the movable mirror 33 that changes with time. The displacement signal of the movable mirror 33 included in the second light receiving signal S2 captures a displacement of the movable mirror 33 at an interval sufficiently narrower than a wavelength of the laser light L2. Specifically, even when the wavelength of the laser light L2 is, for example, several hundreds of nm, positional resolution of less than 10 nm for the movable mirror 33 indicated by the displacement signal can be achieved. Therefore, the measurement light intensity calculator 74 to be described later can also generate a waveform at an interval finer than that in the related art.

1.4.2. Measurement Light Intensity Calculator

The measurement light intensity calculator 74 generates a waveform (an interferogram F(x)) representing the intensity of the interference light with respect to the position of the movable mirror 33 based on the first light receiving signal F(t) and the movable mirror position signal X(t).

The first light receiving signal F(t) is a signal representing the intensity of the interference light entering the first light receiving device 36 at each time. As described above, the first light receiving signal F(t) includes the sample-derived signal and the first modulation signal. Since the first modulation signal is a waveform change reflecting the movement of the movable mirror 33 as described above, the measurement light intensity calculator 74 extracts a waveform reflecting the sample-derived signal by associating the first modulation signal with the movable mirror position signal X(t) acquired from the second optical system 4. Specifically, the measurement light intensity calculator 74 aligns a time of the first light receiving signal F(t) with a time of the movable mirror position signal X(t). The measurement light intensity calculator 74 generates the interferogram F(x) based on the position of the movable mirror 33 and the intensity of the first light receiving signal F(t) at the same time.

Figure 3:
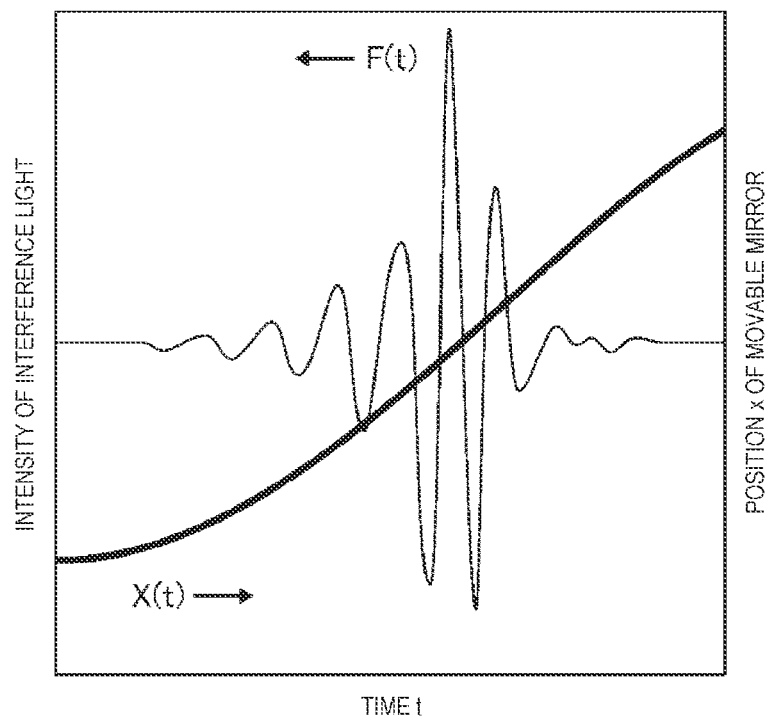
FIG. 3 is a diagram showing an example of a first light receiving signal F(t) and a movable mirror position signal X(t).

FIG. 3 is a diagram showing an example of the first light receiving signal F(t) and the movable mirror position signal X(t). In FIG. 3, a horizontal axis represents the time, and a vertical axis represents the intensity of interference light entering the first light receiving device 36 or the position of the movable mirror 33.

Figure 4:
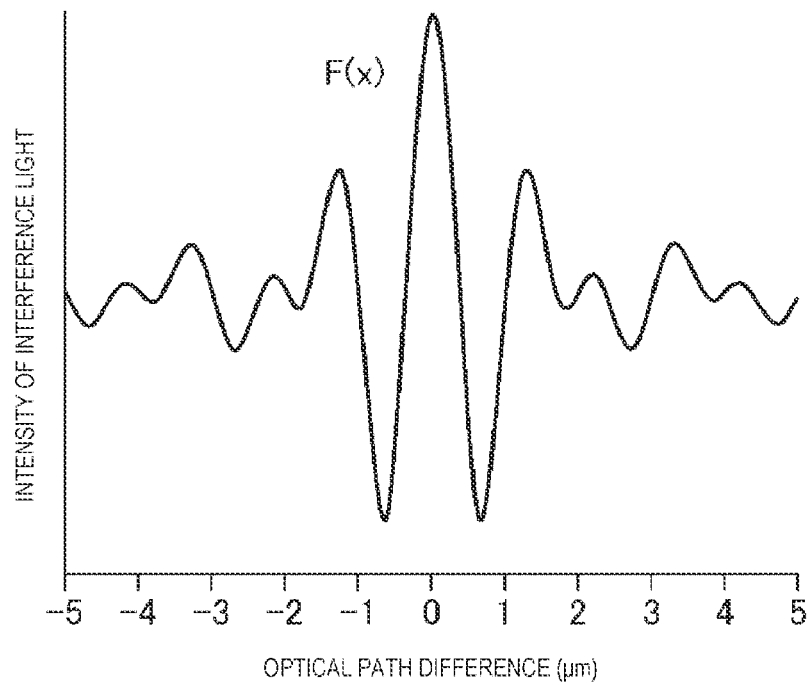
FIG. 4 is a diagram showing an example of an interferogram F(x).

FIG. 4 is a diagram showing an example of the interferogram F(x). In FIG. 4, a horizontal axis represents the optical path difference in the first optical system 3 obtained from the position of the movable mirror 33, and a vertical axis represents the intensity of the interference light of the measurement light L1a and the measurement light L1b. The optical path difference in the first optical system 3 is a difference between an optical path length between the beam splitter 32 and the movable mirror 33 and an optical path length between the beam splitter 32 and the fixed mirror 34. In FIG. 4, a zero optical path difference is an origin of the horizontal axis.

As described above, in the embodiment, the movable mirror position signal X(t) indicating the position of the movable mirror 33 can be acquired with high accuracy (high positional resolution). Therefore, by generating the interferogram F(x) based thereon, the interferogram F(x) having a large number of data points can be obtained. The large number of data points means that the interferogram F(x) has a short sampling interval and high accuracy. Therefore, by using the interferogram F(x) obtained in this manner, spectral information having high resolution can be finally acquired.

Since the sampling interval can be reduced, the interferogram F(x) having a sufficient number of data points can be obtained even when the measurement light L1 having a shorter wavelength (a larger wavenumber) is used. Accordingly, spectral information in a wider wavelength range (wider wavenumber range), that is, spectral information in a wider band can be obtained.

1.4.3. Fourier Transformer

The Fourier transformer 76 performs Fourier transforming on the interferogram F(x). Thus, the spectral information is acquired.

As described above, in the embodiment, digital data of the interferogram F(x) can be acquired with a sufficiently short optical path difference interval. Accordingly, the number of data points of the interferogram F(x) can be sufficiently increased. By performing Fourier transforming on the interferogram F(x), spectral information having sufficiently high wavenumber resolution or sufficiently high wavelength resolution can be acquired even when the measurement light L1 having a shorter wavelength (a larger wavenumber) is used.

The obtained spectral information reflects the highly accurate sample-derived signal generated by the measurement light acting on the sample 9. Therefore, characteristics of the sample 9 can be accurately analyzed based on the spectral information. That is, the spectroscopy apparatus 100 that enables highly accurate spectroscopic analysis can be implemented.

1.4.4. Relationship Between Measurement Accuracy of Movable Mirror Position and Spectral Wavenumber Accuracy and Spectral Wavelength Accuracy As described above, in the embodiment, the movable mirror position signal X(t) can be obtained with high accuracy, so that the spectral information having sufficiently high wavenumber resolution or sufficiently high wavelength resolution can be obtained.

In particular, the accuracy of the movable mirror position signal X(t) can be further improved by bringing a difference between a physical distance between the beam splitter 44 and the optical modulator 43 in the second optical system 4 and a physical distance between the beam splitter 44 and the movable mirror 33 close to zero.

When the position of the movable mirror 33 is measured by the second optical system 4, a measurement error $\Delta d$ is expressed by the following equation (I).

$$\Delta d = \frac{\lambda \Delta \phi}{4\pi n} + WD\left(\frac{\Delta \lambda}{\lambda} + \frac{\Delta n}{n}\right) \tag{I}$$

$\lambda$: wavelength of laser light L2
$\phi$: phase of displacement signal reflecting movement of movable mirror 33
n: air refractive index
WD: difference between physical distance between beam splitter 44 and optical modulator 43 and physical distance between beam splitter 44 and movable mirror 33
$\Delta \phi$: measurement error of phase of displacement signal
$\Delta \lambda$: wavelength fluctuation of laser light L2
$\Delta n$: air refractive index fluctuation In the above equation (I), a second term and a third term on a right side, which may be noise components in the measurement error $\Delta d$, can be made smaller by bringing a difference WD between the physical distances close to zero.

Accordingly, the measurement error Δd is made smaller, so that the accuracy of the movable mirror position signal X(t) can be further improved.

Specifically, it is preferable that |Ls−Lref|≤100 mm, where Lref is an optical path length between the beam splitter 44 and the optical modulator 43 in the second optical system 4 and Ls is an optical path length between the beam splitter 44 and the movable mirror 33. Accordingly, the difference WD between the physical distances in the above equation (I) can be made sufficiently smaller, and the measurement error Δd on order of 1 nm or less can be achieved.

On the other hand, assuming that Lm is a moving distance (an amplitude) of the movable mirror 33 when the movable mirror 33 reciprocates, it is preferable that |Ls−Lref|≤Lm/2 in consideration of the moving distance Lm. Accordingly, the measurement error Δd can be particularly made smaller in consideration of the moving distance Lm of the movable mirror 33.

In consideration of |Ls−Lref|≤100 mm described above, the maximum value of the moving distance Lm of the movable mirror 33 can be considered to be 200 mm. Accordingly, the moving distance Lm of the movable mirror 33 is preferably 200 mm or less. Accordingly, the measurement error Δd of the movable mirror 33 can be particularly made smaller.

Figure 5:
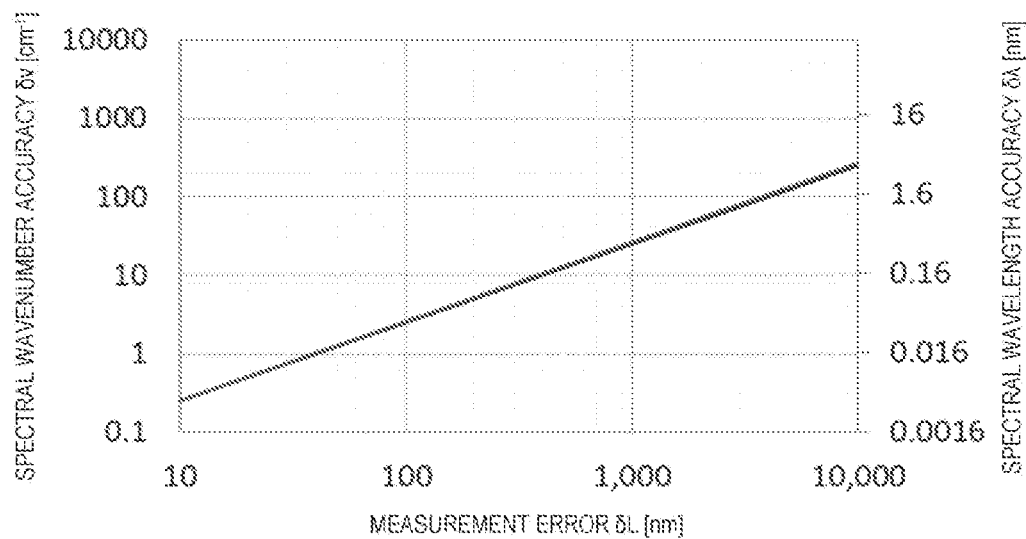
FIG. 5 is a graph showing a relationship between a measurement error of a movable mirror position and an error of a spectral wavenumber (a spectral wavenumber accuracy) and an error of a spectral wavelength (a spectral wavelength accuracy) in spectral information when light (visible light) having a wavelength of 400 nm is used as measurement light.
Figure 6:
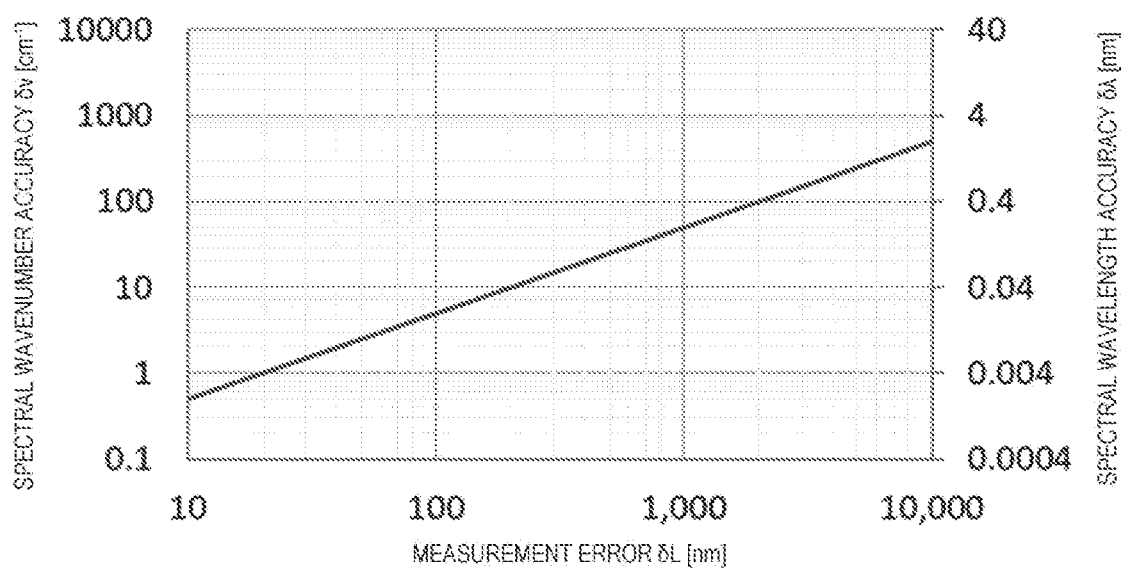
FIG. 6 is a graph showing a relationship between the measurement error of the movable mirror position and the error of the spectral wavenumber (the spectral wavenumber accuracy) and the error of the spectral wavelength (the spectral wavelength accuracy) in the spectral information when light (ultraviolet light) having a wavelength of 200 nm is used as a measurement light.

FIG. 5 is a graph showing a relationship between a measurement error δL of the position of the movable mirror 33 and an error of the spectral wavenumber (a spectral wavenumber accuracy) or an error of the spectral wavelength (a spectral wavelength accuracy) in the spectral information when light (visible light) having a wavelength of 400 nm is used as the measurement light L1. FIG. 6 is a graph showing a relationship between the measurement error δL of the position of the movable mirror 33 and the error of the spectral wavenumber (the spectral wavenumber accuracy) or the error of the spectral wavelength (the spectral wavelength accuracy) in the spectral information when light (ultraviolet light) having a wavelength of 200 nm is used as the measurement light L1. In the examples shown in FIGS. 5 and 6, a moving distance L of the movable mirror 33 is 1 mm and the measurement error is δL.

In general, wavenumber resolution Δv can be increased by increasing the moving distance L of the movable mirror 33. For example, when the moving distance L is 1 mm, the wavenumber resolution αv calculated from the spectral information that is obtained by sampling the interferogram by a method in the related art is 5 $cm^{-1}$.

The examples shown in FIGS. 5 and 6 show a relationship between the measurement error δL and a spectral wavenumber accuracy δv or a spectral wavelength accuracy δλ when the moving distance L of the movable mirror 33 is 1 mm. In FIG. 5, for example, when the measurement error δL is 100 nm, the spectral wavenumber accuracy δv is about 2.5 $cm^{-1}$, and the spectral wavelength accuracy δλ is about 0.04 nm. In FIG. 6, for example, when the measurement error δL is 100 nm, the spectral wavenumber accuracy δv is about 5.0 $cm^{-1}$, and the spectral wavelength accuracy δλ is about 0.02 nm. The measurement error δL of 100 nm can be easily achieved by using the optical device 1 according to the embodiment. Accordingly, it is understood from the results of FIGS. 5 and 6 that even when light having a shorter wavelength is used as the measurement light L1, the spectral wavenumber accuracy δv and the spectral wavelength accuracy δλ that are at least equivalent to the above-described wavenumber resolution Δv and the wavelength resolution calculated therefrom can be obtained. Thus, by making the measurement error δL smaller using the optical device 1 according to the embodiment, the spectral wavenumber accuracy δv and the spectral wavelength accuracy δλ can be maintained or improved regardless of the wavelength of the measurement light L1, in other words, even when the measurement light L1 having a wide wavelength range is used.

Figure 7:
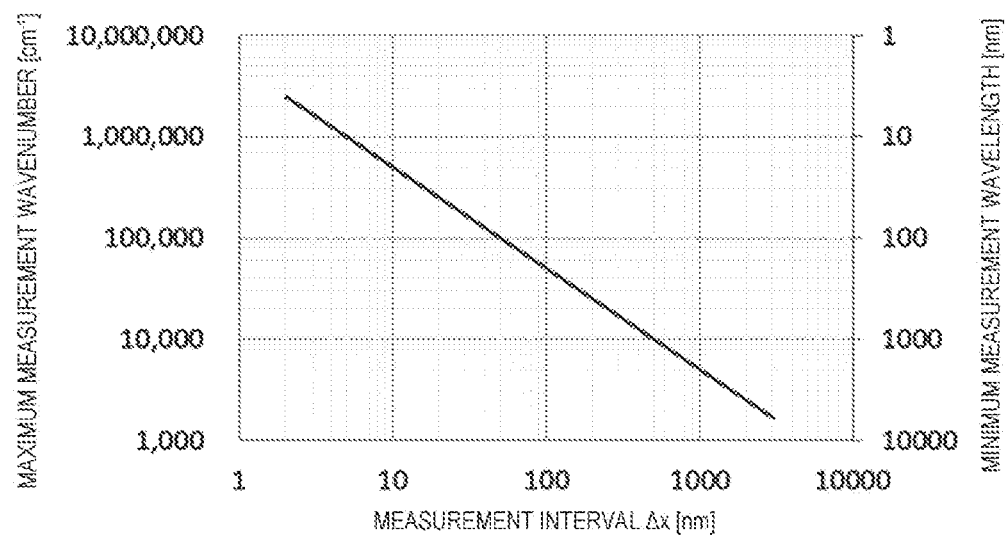
FIG. 7 is a graph showing a relationship between a measurement interval of a movable mirror and a maximum measurement wavenumber or a minimum measurement wavelength in the spectral information.

1.4.5. Relationship Between Measurement Interval of Movable Mirror Position and Maximum Measurement Wavenumber and Minimum Measurement Wavelength FIG. 7 is a graph showing a relationship between a measurement interval Δx of the position of the movable mirror 33 and a maximum measurement wavenumber or a minimum measurement wavelength in the spectral information. As shown in FIG. 7, the smaller the measurement interval Δx, the larger the maximum measurement wavenumber and the shorter the minimum measurement wavelength. Accordingly, the spectral information in a wider wavenumber range (a wavelength range) (the spectral information in a wider band) can be acquired by making the measurement interval Δx smaller. In order to implement the stable measurement interval Δx, the measurement error Δd is preferably equal to or less than 1/10 of the measurement interval Δx. Accordingly, it can be said that the measurement error Δd on order of 1 nm described above is the measurement accuracy capable of implementing the measurement interval Δx=10 nm in FIG. 7.

2. First Modification of First Embodiment

Next, an optical device and a spectroscopy apparatus according to a first modification of the first embodiment will be described.

Figure 8:
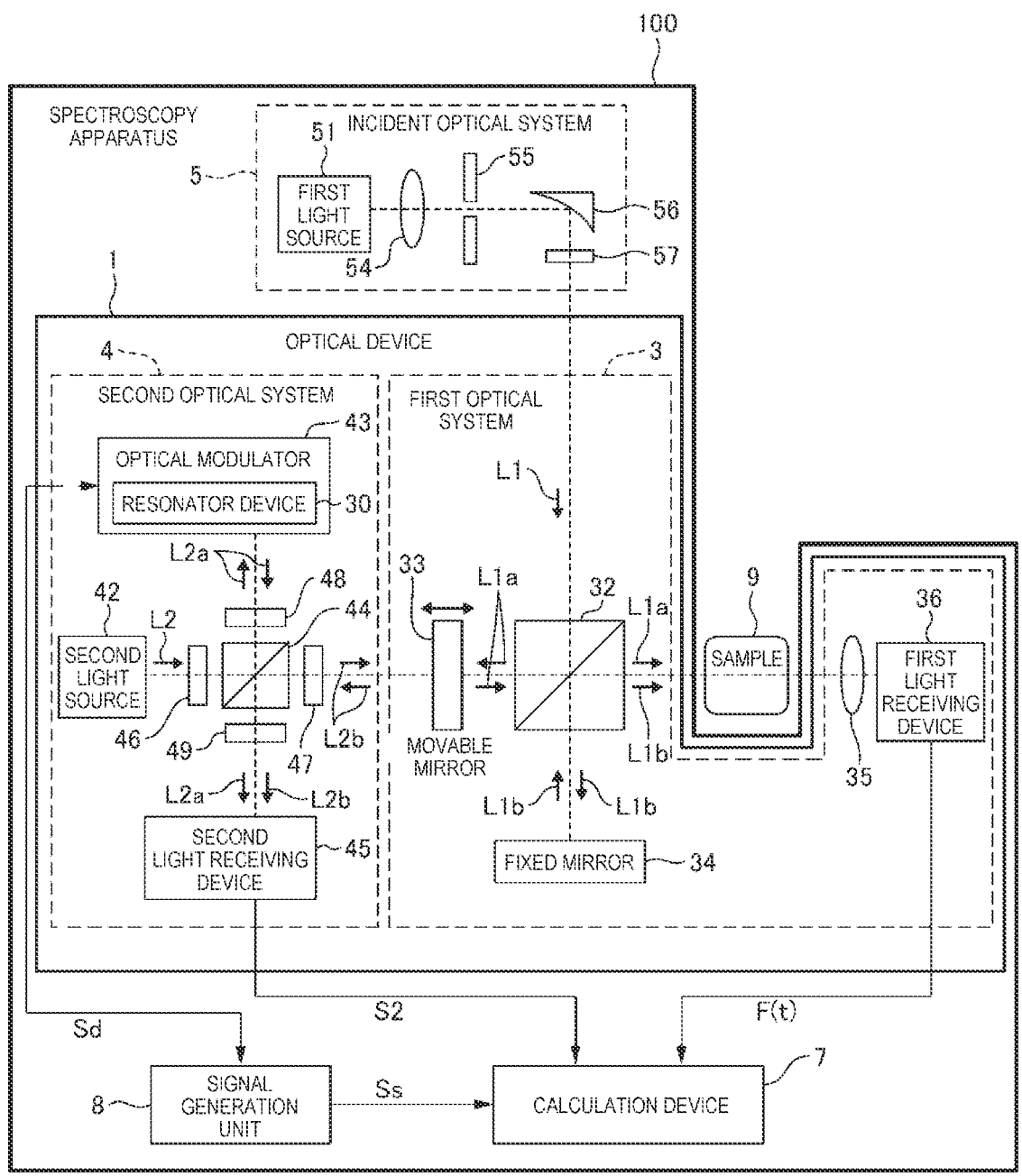
FIG. 8 is a schematic configuration diagram showing a schematic configuration of a spectroscopy apparatus according to a first modification of the first embodiment.

FIG. 8 is a schematic configuration diagram showing a schematic configuration of the spectroscopy apparatus 100 according to the first modification of the first embodiment.

The spectroscopy apparatus 100 shown in FIG. 8 is the same as the spectroscopy apparatus 100 shown in FIG. 1 except that configurations of the optical device 1 and the incident optical system 5 are different.

The incident optical system 5 shown in FIG. 8 is configured to guide the measurement light L1 to the optical device 1 along a path that does not pass through the sample 9. Specifically, the incident optical system 5 shown in FIG. 8 includes the first light source 51, the condenser lens 54, an aperture 55, a curved mirror 56, and a cut filter 57.

The condenser lens 54 condenses the measurement light L1 emitted from the first light source 51, and passes the measurement light L1 through the aperture 55 at a light condensing position. The curved mirror 56 switches an optical path while converting divergent light into parallel light. The cut filter 57 is a filter that cuts light other than light of a target wavelength range.

The optical device 1 shown in FIG. 8 is configured such that the sample 9 is provided between the beam splitter 32 and the first light receiving device 36. That is, the optical device 1 shown in FIG. 8 is configured such that the measurement light L1a and the measurement light L1b mixed by the beam splitter 32 pass through the sample 9 and enter the first light receiving device 36 via the condenser lens 35.

In the first modification as described above, the same effects as those of the first embodiment can be obtained.

3. Second Modification of First Embodiment

Next, an optical device and a spectroscopy apparatus according to a second modification of the first embodiment will be described.

Figure 9:
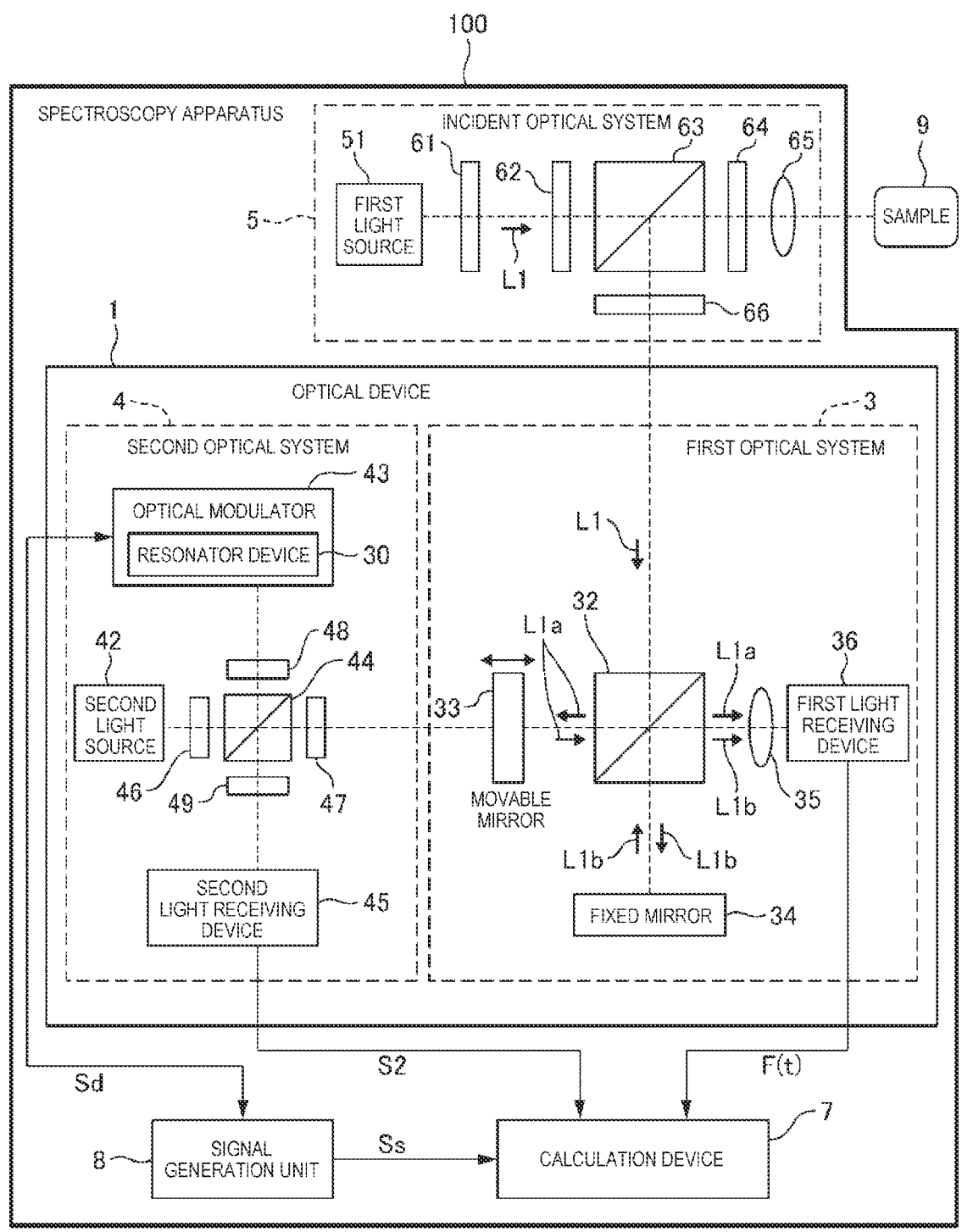
FIG. 9 is a schematic configuration diagram showing a schematic configuration of a spectroscopy apparatus according to a second modification of the first embodiment.

FIG. 9 is a schematic configuration diagram showing a schematic configuration of the spectroscopy apparatus 100 according to the second modification of the first embodiment.

The spectroscopy apparatus 100 shown in FIG. 9 is the same as the spectroscopy apparatus 100 shown in FIG. 1 except that configurations of the optical device 1 and the incident optical system 5 are different and the spectroscopy apparatus 100 shown in FIG. 9 is applicable to Raman spectroscopic analysis, fluorescence spectroscopic analysis, and the like for the sample 9.

The incident optical system 5 shown in FIG. 9 includes the first light source 51, a band-pass filter 61, a half-wavelength plate 62, a beam splitter 63, a quarter-wavelength plate 64, a condenser lens 65, and a light-attenuating filter 66.

The first light source 51 shown in FIG. 9 is appropriately selected according to the purpose of Raman spectroscopy, fluorescence spectroscopy, or the like. For example, in the case of the Raman spectroscopy, a light source that emits light having a narrow spectral line width as the measurement light L1 is used. In the case of the fluorescence spectroscopy, an optimum light source is used according to the type of the sample 9. In the case of the Raman spectroscopy, for example, a gas laser such as an He—Ne laser or an Ar laser, a semiconductor laser device such as a DFB-LD, an FBG-LD, a VCSEL, or an FP-LD, or a solid-state laser is used as the first light source 51. In the case of the fluorescence spectroscopy, for example, a xenon lamp, a mercury lamp, or the like is used as the first light source 51. FIG. 9 shows the incident optical system 5 when the first light source 51 is a laser light source.

The band-pass filter 61 cuts light having an extra wavelength and emitted from the first light source 51 and transmits the cut light as the measurement light L1. The measurement light L1 passing through the half-wavelength plate 62 becomes linearly polarized light including P-polarized light and S-polarized light, and is split into two light beams including the P-polarized light and the S-polarized light by the beam splitter 63, which is a polarization beam splitter. The measurement light L1, which is the P-polarized light, is converted into circularly polarized light by the quarter-wavelength plate 64, passes through the condenser lens 65, and enters the sample 9. The measurement light L1 emitted from the sample 9, together with Raman scattered light, fluorescence, and the like, passes through the condenser lens 65, is converted into the S-polarized light by the quarter-wavelength plate 64, and is reflected by the beam splitter 63. When the measurement light L1 passes through the light-attenuating filter 66, most of the measurement light L1 is selectively attenuated, and the Raman scattered light, the fluorescence, and the like propagating together with the measurement light L1 are selectively transmitted. That is, assuming that a wavelength of the measurement light L1 is a "first wavelength", the light-attenuating filter 66 attenuates light having the first wavelength and passes light including a sample-derived signal. Accordingly, even when an intensity of the light including the sample-derived signal is weak, the second light receiving device 45 can output a second light receiving signal having a high S/N ratio. Examples of such a light-attenuating filter 66 include a notch filter and a Raman long-pass filter having an optical density (an OD value) of 6.0 or more.

An avalanche type photodiode is particularly preferably used as the first light receiving device 36 provided in the optical device 1 shown in FIG. 9. Accordingly, the Raman scattered light, the fluorescence, and the like can be more appropriately received.

In the second modification as described above, the same effects as those of the first embodiment can be obtained.

4. Third Modification of First Embodiment

Next, an optical device and a spectroscopy apparatus according to a third modification of the first embodiment will be described.

Figure 10:
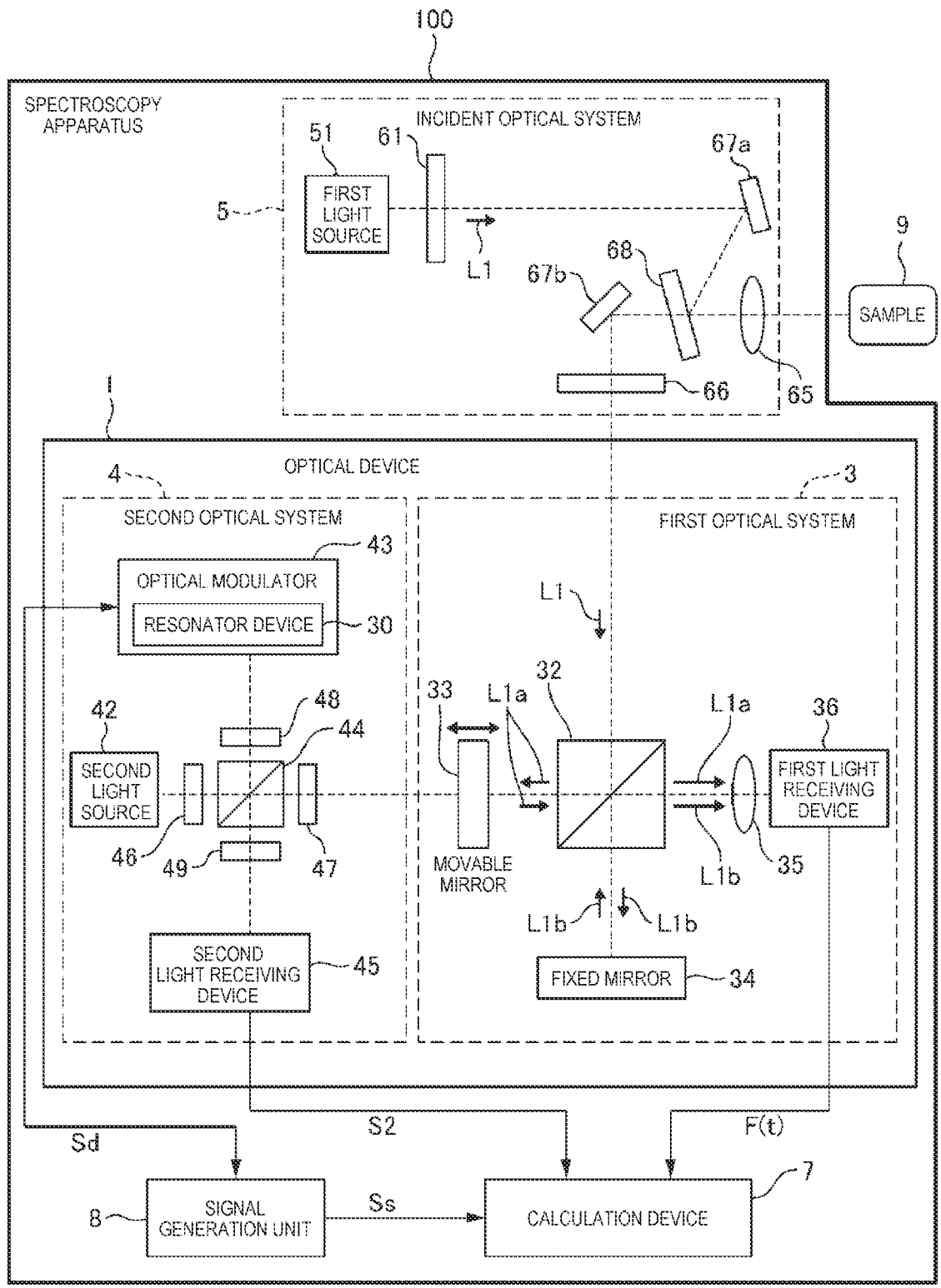
FIG. 10 is a schematic configuration diagram showing a schematic configuration of a spectroscopy apparatus according to a third modification of the first embodiment.

FIG. 10 is a schematic configuration diagram showing a schematic configuration of the spectroscopy apparatus 100 according to the third modification of the first embodiment.

The spectroscopy apparatus 100 shown in FIG. 10 is the same as the spectroscopy apparatus 100 shown in FIG. 9 except that configurations of the optical device 1 and the incident optical system 5 are different.

The incident optical system 5 shown in FIG. 10 includes the first light source 51, the band-pass filter 61, reflecting mirrors 67a and 67b, a notch filter 68, the condenser lens 65, and the light-attenuating filter 66.

The measurement light L1 emitted from the first light source 51 passes through the band-pass filter 61, is reflected by the reflecting mirror 67a, and enters the notch filter 68. The notch filter 68 has, for example, an optical density of 6.0 or more, and has a function of selectively reflecting the measurement light L1. The measurement light L1 reflected by the notch filter 68 passes through the condenser lens 65, and enters the sample 9. The measurement light L1 reflected by the sample 9 passes through the condenser lens 65 and is selectively reflected by the notch filter 68. On the other hand, Raman scattered light, fluorescence, and the like propagating together with the measurement light L1 are transmitted through the notch filter 68. The light transmitted through the notch filter 68 is reflected by the reflecting mirror 67b, passes through the light-attenuating filter 66, and enters the optical device 1. In this case, a Raman long-pass filter is used as the light-attenuating filter 66.

In the optical device 1 shown in FIG. 10, a non-polarization type beam splitter is used as the beam splitter 32. In the incident optical system 5 shown in FIG. 10, laser light may be used as the measurement light L1, and in this case, appropriate interference light can be obtained by setting the first optical system 3 as described above.

In the third modification as described above, the same effects as those of the first embodiment can be obtained.

5. Fourth Modification of First Embodiment

Next, an optical device and a spectroscopy apparatus according to a fourth modification of the first embodiment will be described.

Figure 11:
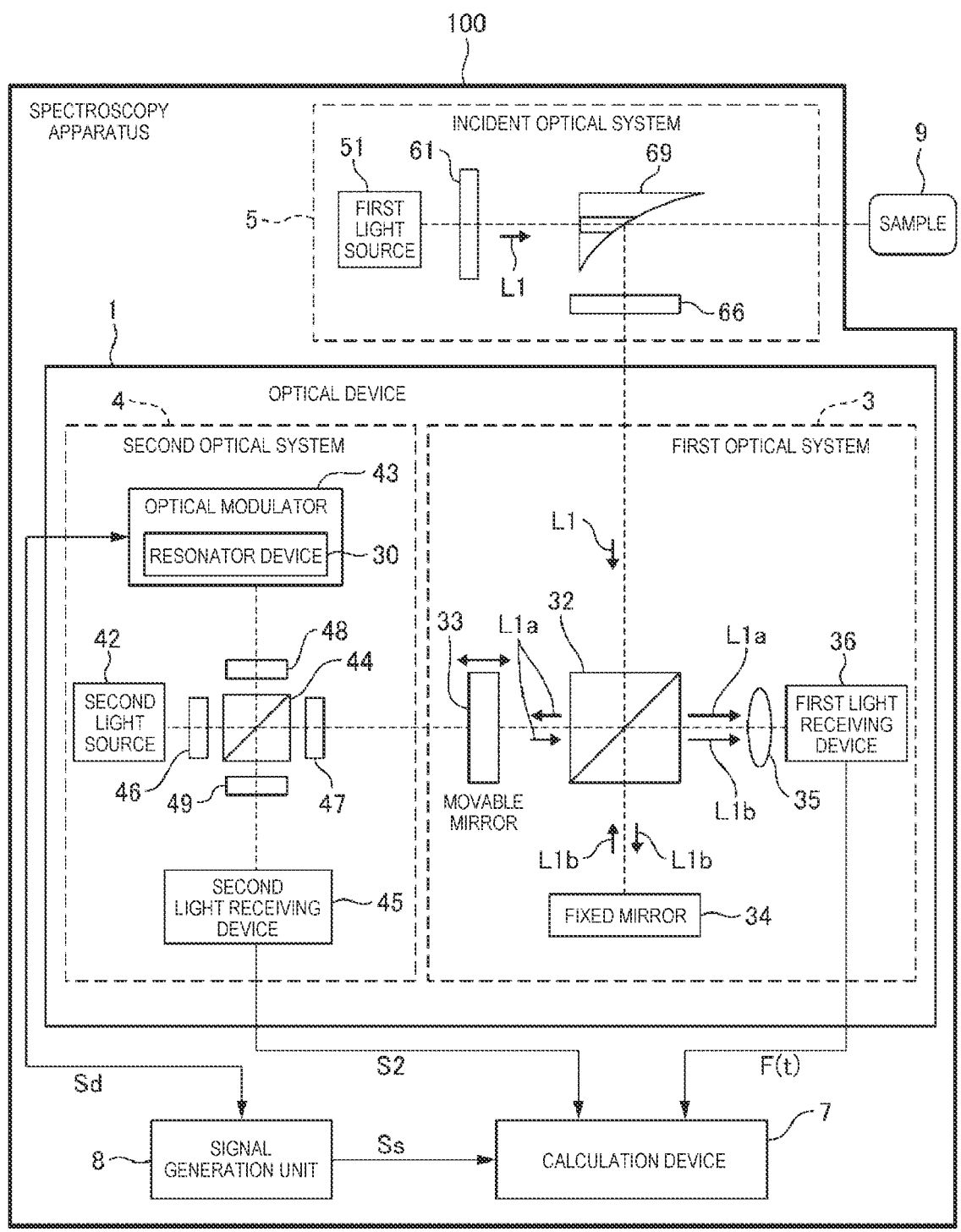
FIG. 11 is a schematic configuration diagram showing a schematic configuration of a spectroscopy apparatus according to a fourth modification of the first embodiment.

FIG. 11 is a schematic configuration diagram showing a schematic configuration of the spectroscopy apparatus 100 according to the fourth modification of the first embodiment.

The spectroscopy apparatus 100 shown in FIG. 11 is the same as the spectroscopy apparatus 100 shown in FIG. 10 except that configurations of the optical device 1 and the incident optical system 5 are different.

The incident optical system 5 shown in FIG. 11 includes the first light source 51, the band-pass filter 61, an off-axial paraboloidal mirror 69 with a through hole, and the light-attenuating filter 66.

The measurement light L1 emitted from the first light source 51 is transmitted through the band-pass filter 61, passes through the off-axial paraboloidal mirror 69 with a through hole, and enters the sample 9. The measurement light L1 emitted from the sample 9 is collimated and reflected by the off-axial paraboloidal mirror 69 with a through hole, passes through the light-attenuating filter 66, and enters the optical device 1.

In the fourth modification as described above, the same effects as those of the first embodiment can be obtained.

The optical device 1 may include the incident optical system 5 in the first embodiment described above and the modifications thereof.

6. Fifth Modification of First Embodiment

Next, a spectroscopy apparatus according to a fifth modification of the first embodiment will be described.

Figure 12:
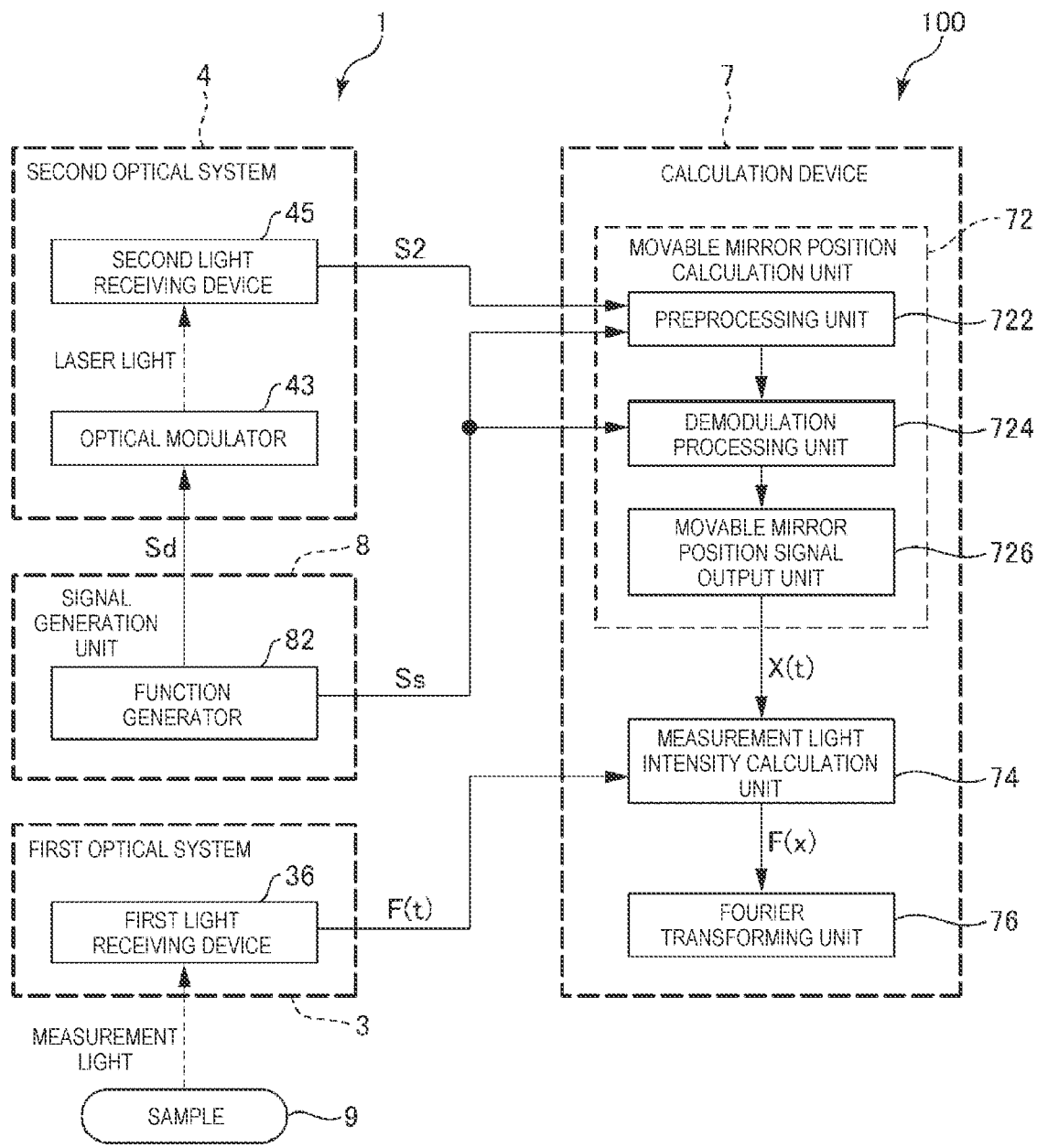
FIG. 12 is a schematic diagram showing main parts of a first optical system, a second optical system, a signal generator, and a calculation device provided in a spectroscopy apparatus according to a fifth modification of the first embodiment.

FIG. 12 is a schematic diagram showing main parts of the first optical system 3, the second optical system 4, the signal generator 8, and the calculation device 7 provided in the spectroscopy apparatus 100 according to the fifth modification of the first embodiment.

The spectroscopy apparatus 100 shown in FIG. 12 is the same as the spectroscopy apparatus 100 shown in FIG. 2 except that a configuration of the signal generator 8 is different.

The signal generator 8 shown in FIG. 12 includes a function generator 82. The function generator 82 is a signal generator that outputs a highly accurate waveform, that is, a highly stable and low-jitter signal. Therefore, the signal generator 8 shown in FIG. 12 can output the drive signal Sd and the reference signal Ss with higher accuracy, and can finally obtain a position of the movable mirror 33 in the calculation device 7 with higher accuracy. The function generator 82 may be a signal generator called a signal generator.

In the fifth modification as described above, the same effects as those of the first embodiment can be obtained.

7. Sixth Modification of First Embodiment

Next, a spectroscopy apparatus according to a sixth modification of the first embodiment will be described.

Figure 13:
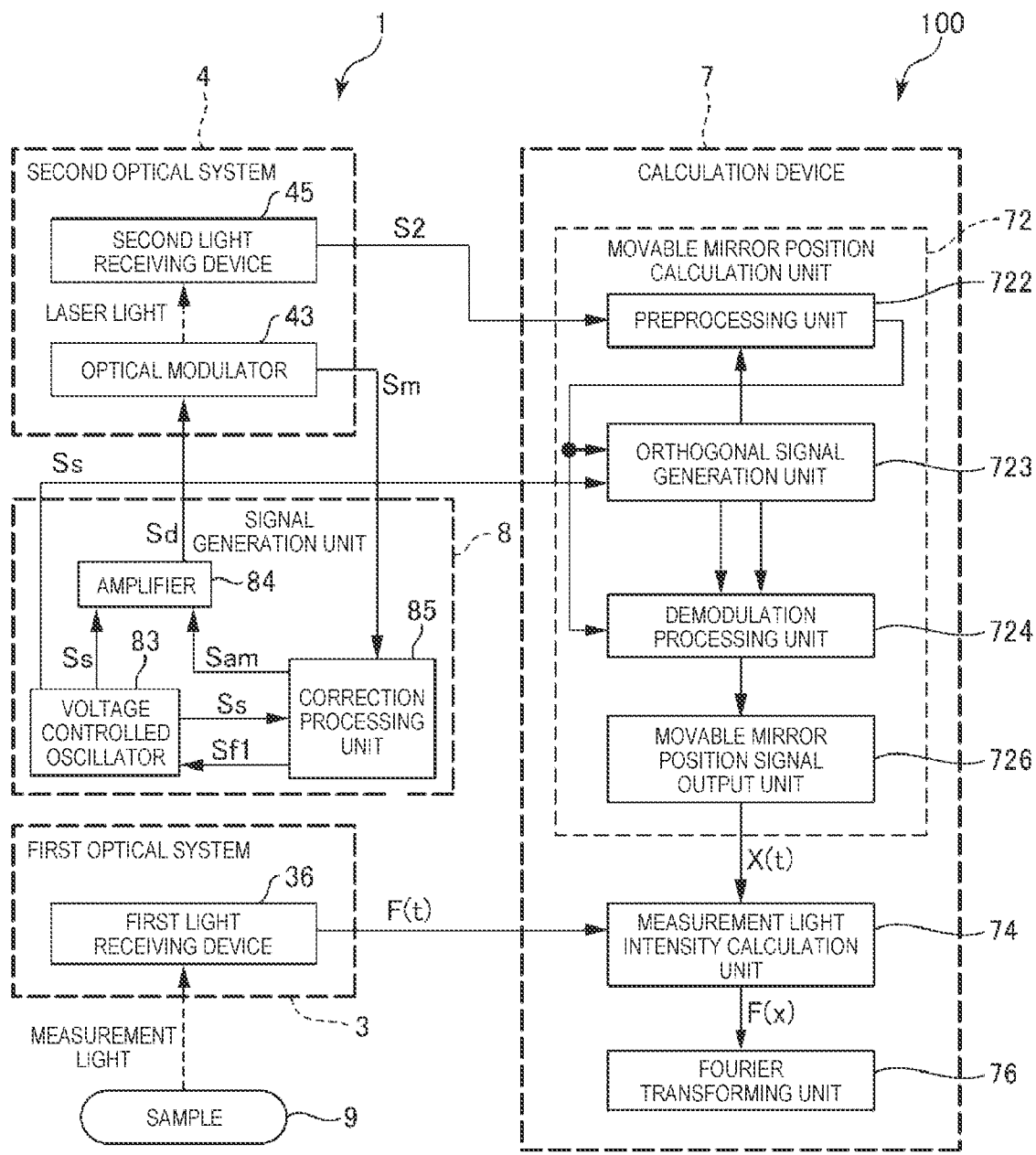
FIG. 13 is a schematic diagram showing main parts of a first optical system, a second optical system, a signal generator, and a calculation device provided in a spectroscopy apparatus according to a sixth modification of the first embodiment.

FIG. 13 is a schematic diagram showing main parts of the first optical system 3, the second optical system 4, the signal generator 8, and the calculation device 7 provided in the spectroscopy apparatus 100 according to the sixth modification of the first embodiment.

The spectroscopy apparatus 100 shown in FIG. 13 is the same as the spectroscopy apparatus 100 shown in FIG. 2 except that configurations of the signal generator 8 and the calculation device 7 are different.

In the modification, as shown in FIG. 13, the signal generator 8 includes a voltage controlled oscillator 83, an amplifier 84, and a correction processing unit 85. The calculation device 7 includes the movable mirror position calculation unit 72, the measurement light intensity calculator 74, and the Fourier transformer 76. Further, the movable mirror position calculation unit 72 includes the preprocessing unit 722, an orthogonal signal generator 723, the demodulation processing unit 724, and the movable mirror position signal output unit 726.

7.1. Signal Generator

First, the signal generator 8 shown in FIG. 13 will be described.

7.1.1. Configuration of Signal Generator

The voltage controlled oscillator 83 is a voltage controlled oscillator (VCO) and has a function of controlling a frequency of an output periodic signal based on an input voltage signal. Accordingly, the voltage controlled oscillator 83 generates the reference signal Ss having a target frequency and outputs the reference signal Ss to the amplifier 84 and the calculation device 7. The voltage controlled oscillator 83 is not limited to the VCO as long as it is an oscillator capable of adjusting the frequency of the periodic signal to be output.

The amplifier 84 has a function of controlling an amplitude of the output periodic signal based on an input control signal. Accordingly, the amplifier 84 amplifies the input reference signal Ss, generates the drive signal Sd having a target amplitude, and outputs the drive signal Sd to the optical modulator 43.

As shown in FIG. 13, the reference signal Ss output from the voltage controlled oscillator 83 and an output signal Sm output corresponding to driving of the optical modulator 43 are input to the correction processing unit 85. The correction processing unit 85 outputs a frequency control signal Sf1 (a correction signal) to the voltage controlled oscillator 83. Further, the correction processing unit 85 outputs an amplification factor control signal Sam (a correction signal) to the amplifier 84.

The correction processing unit 85 is mounted on, for example, an FPGA or the like and is preferably disposed in the vicinity of the optical modulator 43. Accordingly, a physical distance between the optical modulator 43 and the correction processing unit 85 can be reduced, and for example, a decrease in S/N ratio of the output signal Sm due to influence of electromagnetic noise can be prevented.

Figure 14:
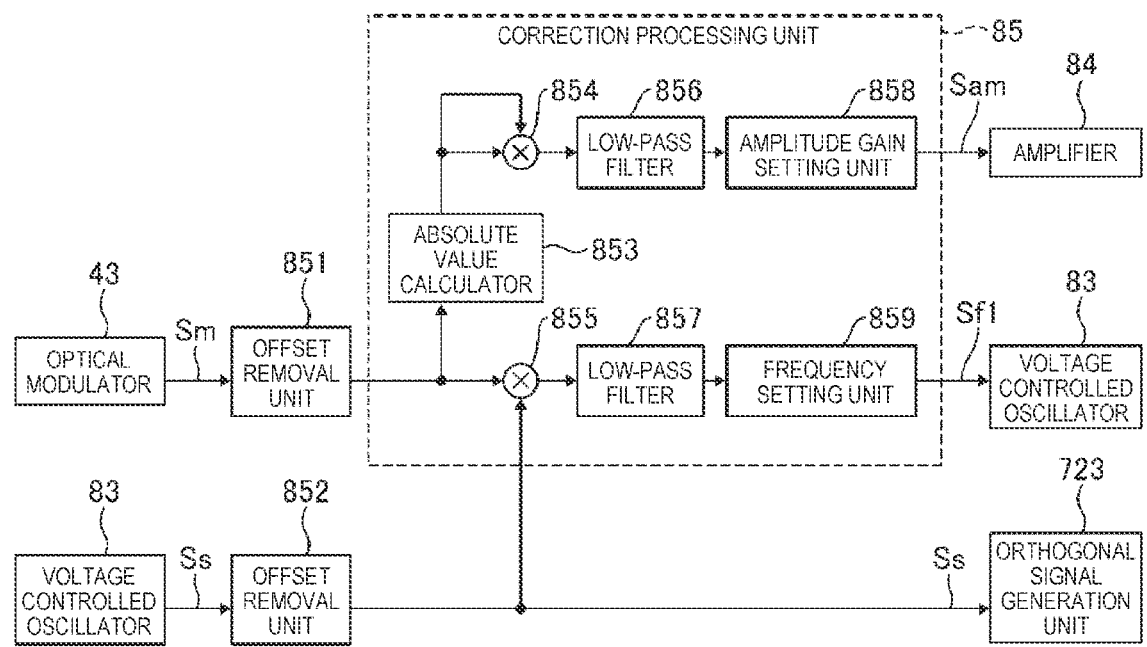
FIG. 14 is a diagram showing details of a correction processing unit in the schematic diagram shown in FIG. 13.

FIG. 14 is a diagram showing details of the correction processing unit 85 in the schematic diagram shown in FIG. 13.

The output signal Sm from the optical modulator 43 is input to an offset removal unit 851 shown in FIG. 14. The offset removal unit 851 has a function of removing a direct current (DC) component and extracting an alternating current (AC) component. The output signal Sm passing through the offset removal unit 851 is input to the correction processing unit 85.

The reference signal Ss from the voltage controlled oscillator 83 is input to an offset removal unit 852 shown in FIG. 14. The offset removal unit 852 has a function of removing a direct current (DC) component and extracting an alternating current (AC) component. The reference signal Ss passing through the offset removal unit 852 is input to the correction processing unit 85 and the orthogonal signal generator 723.

The correction processing unit 85 shown in FIG. 14 includes an absolute value calculator 853, a multiplier 854, a multiplier 855, a low-pass filter 856, a low-pass filter 857, an amplitude gain setting unit 858, and a frequency setting unit 859.

The absolute value calculator 853 calculates an absolute value of the output signal Sm passing through the offset removal unit 851.

The multipliers 854 and 855 are circuits that output signals proportional to a product of two input signals. Among them, in the multiplier 854, both of the two input signals are the output signal Sm. Therefore, the multiplier 854 outputs a signal proportional to a square of the output signal Sm. On the other hand, in the multiplier 855, the two input signals are the output signal Sm and the reference signal Ss. Therefore, the multiplier 855 outputs a signal proportional to a product of the output signal Sm and the reference signal Ss.

The multipliers 854 and 855 may be, for example, a Gilbert cell device, or may be a circuit that performs addition and subtraction after logarithmically conversing two input signals with an operational amplifier or the like, and thereafter performs inverse logarithmic conversion.

The low-pass filters 856 and 857 are filters that cut off a signal in a high frequency band for the input signal. A transmission frequency band of the low-pass filters 856 and 857 may be any band as long as it is a band in which a frequency equal to or higher than twice the frequency of the drive signal Sd can be removed, and is preferably a band in which a frequency equal to or higher than the frequency of the drive signal Sd can be removed.

The signal output from the multiplier 854 and passed through the low-pass filter 856 becomes a signal having a value corresponding to an amplitude of the output signal Sm, as will be described later. The amplitude gain setting unit 858 has a function of obtaining, based on the signal, an amplitude (a target amplitude) to be set to the drive signal Sd. The amplitude gain setting unit 858 controls a gain (an amplification factor) to be set in the amplifier 84 of the signal generator 8 such that the amplitude of the drive signal Sd is the target amplitude. Examples of a control logic include feedback control such as PI control and PID control. The amplitude gain setting unit 858 outputs, to the amplifier 84, the amplification factor control signal Sam corresponding to the gain to be set.

The amplifier 84 amplifies the amplitude of the drive signal Sd based on the amplification factor control signal Sam. Accordingly, the amplitude of the drive signal Sd is corrected.

The signal output from the multiplier 855 and input to the frequency setting unit 859 through the low-pass filter 857 becomes a signal having a value corresponding to a phase difference between the output signal Sm and the reference signal Ss, as will be described later. Here, a phase of the output signal Sm corresponds to a phase of the drive signal Sd. The phase of the drive signal Sd corresponds to the phase of the reference signal Ss. Therefore, the frequency setting unit 859 has a function of obtaining a frequency (a target frequency) to be set to the reference signal Ss. Then, the frequency setting unit 859 controls a voltage to be set in the voltage controlled oscillator 83 of the signal generator 8 such that the frequency of the reference signal Ss is the target frequency. Examples of a control logic include feedback control such as PI control and PID control. The frequency setting unit 859 outputs, to the voltage controlled oscillator 83, a frequency control signal Sf1 corresponding to the frequency to be set.

The voltage controlled oscillator 83 generates a reference signal Ss having a frequency corresponding to the frequency control signal Sf1. Accordingly, the frequency of the reference signal Ss is corrected. Accordingly, the frequency of the drive signal Sd is also corrected.

7.1.2. Acquisition of Output Signal from Optical Modulator

Figure 15:
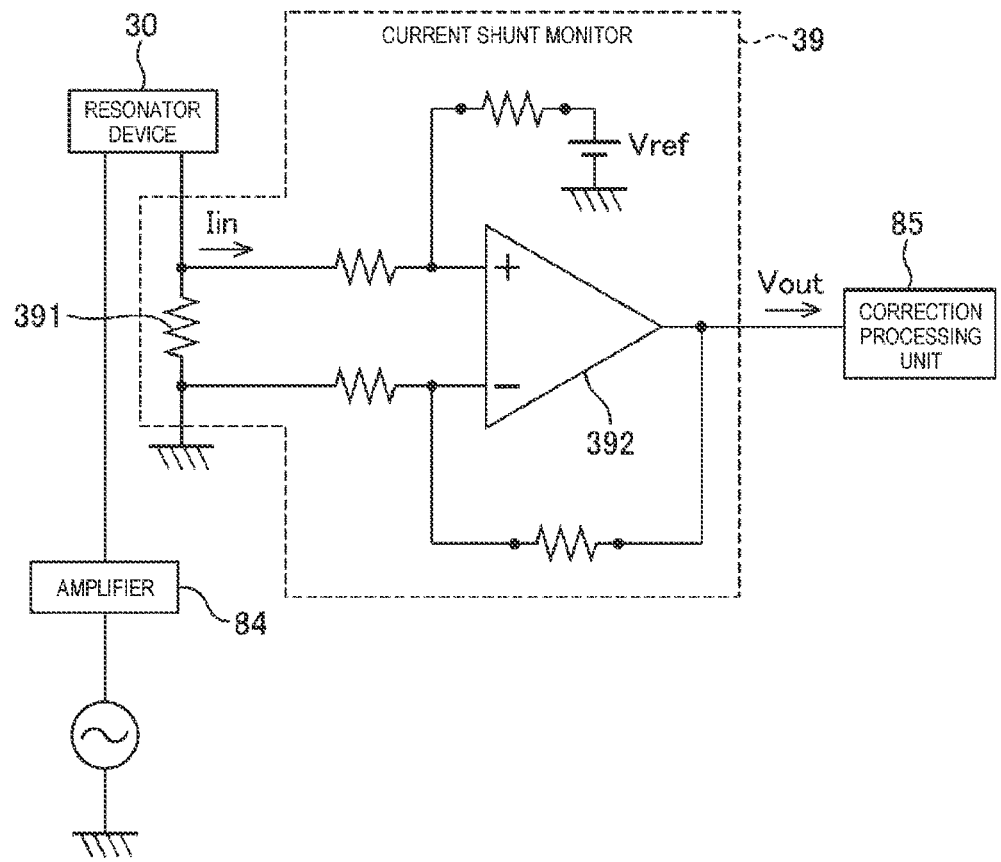
FIG. 15 is a diagram showing an example of a circuit that acquires an output signal from an optical modulator.

FIG. 15 is a diagram showing an example of a circuit for acquiring the output signal Sm from the optical modulator 43.

The output signal Sm may be a signal obtained by detecting a current flowing through the resonator device 30 provided in the optical modulator 43, or may be a signal obtained by detecting a voltage applied to the resonator device 30. For example, when the signal obtained by detecting a current flowing through the resonator device 30 is set as the output signal Sm, as shown in FIG. 15, a value of the current flowing through the resonator device 30 is detected using a current shunt monitor 39. The current shunt monitor 39 shown in FIG. 15 includes a shunt resistor 391 and an operational amplifier 392, and converts the value of the current flowing through the resonator device 30 into a voltage value for detection. Accordingly, the output signal Sm, which is a voltage signal, is obtained. The obtained output signal Sm is converted into a digital signal and output to the correction processing unit 85.

Examples of a method for detecting the current flowing through the resonator device 30 include a method using a Hall device and a method of detecting an electromotive force by winding a coil around a current path, in addition to the above-described method.

7.1.3. Correction Processing

Next, the correction processing performed by the correction processing unit 85 will be described. The correction processing refers to changing set values of the voltage controlled oscillator 83 and the amplifier 84 based on the correction signal output from the correction processing unit 85 to correct the drive signal Sd and the reference signal Ss.

When the output signal Sm from the optical modulator 43 is, for example, a voltage signal, the output signal Sm before passing through the offset removal unit 851 is expressed by the following equation (II).

$$V_{QOM}=A_m \sin(\omega_m t+\alpha_{m1})+O_{QOM} \qquad (II)$$

In the above equation (II), $V_{QOM}$ is a voltage value of the output signal Sm. $A_m$ is a coefficient corresponding to the amplitude of the output signal Sm, $\alpha_{m1}$ is a phase difference of the output signal Sm with respect to the reference signal Ss, and $-\pi/2<\alpha_{m1}<\pi/2$ is satisfied. Further, $O_{QOM}$ is a DC component of the output signal Sm.

Then, the output signal Sm after passing through the offset removal unit 851 is expressed by the following equation (II-1).

$$V_{QOM}=A_m \sin(\omega_m t+\alpha_{m1}) \qquad (I-1)$$

On the other hand, the reference signal Ss before passing through the offset removal unit 852 is expressed by the following equation (III).

$$V_{OSC}=v_{OSC} \cos(\omega_m t)+O_{OSC} \qquad (III)$$

In the above equation (III), $V_{OSC}$ is the voltage value of the reference signal Ss. In addition, $v_{OSC}$ is a coefficient corresponding to an amplitude of the reference signal Ss, and $O_{OSC}$ is a DC component of the reference signal Ss.

Then, the reference signal Ss after passing through the offset removal unit 852 is expressed by the following equation (III-1).

$$V_{OSC}=v_{OSC} \cos(\omega_m t) \qquad (III-1)$$

The output signal Sm after passing through the offset removal unit 851 is split into two signals. One output signal Sm is squared by the multiplier 854 after passing through the absolute value calculator 853, and as a result is expressed by the following equation (II-2).

$$V_{QOM}^2 = \frac{A_m^2}{2}\{1-\cos(2\omega_m t+2\alpha_{m1})\} \qquad (II-2)$$

Thereafter, when the one output signal Sm passes through the low-pass filter 856, only the first term of the above equation (II-2) on a right side is extracted. Accordingly, the output signal Sm after passing through the low-pass filter 856 is expressed by the following equation (II-3).

$$V_{QOM}^2 = \frac{A_m^2}{2} \quad \text{(II-3)}$$

As expressed by the above equation (11-3), an input signal $V_{QOM}^2$ input to the amplitude gain setting unit 858 is a signal that does not change with time. Therefore, the amplitude gain setting unit 858 performs feedback control on the output signal Sm expressed by the above equation (II-3) using a value obtained by substituting a target coefficient $A_m$ into the above equation (II-3) as a control target value. Then, the amplification factor control signal Sam corresponding to the control target value is output to the amplifier 84 of the signal generator 8. Accordingly, a gain of the amplitude in the amplifier 84 can be changed to correct the amplitude of the drive signal Sd to the target amplitude.

The other one output signal Sm of the two split signals is multiplied by the reference signal Ss by the multiplier 855. Accordingly, the signal output from the multiplier 855 is expressed by the following equation (IV).

$$V_{QOM} \cdot V_{OSC} = \frac{A_m v_{OSC}}{2}\{\sin(\alpha_{m1}) + \sin(2\omega_m t + \alpha_{m1})\} \quad \text{(IV)}$$

Thereafter, when the other one output signal Sm passes through the low-pass filter 857, only the first term of the above equation (IV) on a right side is extracted. Accordingly, the output signal Sm after passing through the low-pass filter 857 is expressed by the following equation (IV-2).

$$V_{QOM} \cdot V_{OSC} = \frac{A_m v_{OSC}}{2}\sin(\alpha_{m1}) \quad \text{(IV-2)}$$

As expressed by the above equation (IV-2), the input signal $V_{QOM} \cdot V_{OSC}$ input to the frequency setting unit 859 is a signal including the coefficient $A_m$, the coefficient $v_{OSC}$, and a phase difference $\alpha_{m1}$ on the right side. Among them, the coefficient $v_{OSC}$ is known. On the other hand, the coefficient $A_m$ is controlled so as to satisfy $0<A_m$ and converge to the target coefficient $A_m$ as described above. Therefore, the input signal $V_{QOM} \cdot V_{OSC}$ is also a signal that does not change with time. Therefore, the frequency setting unit 859 performs feedback control using, for example, a value obtained by substituting the target phase difference $\alpha_{m1}$ into the above equation (IV-2) as a control target value. Then, the frequency control signal Sf1 corresponding to the control target value is output to the voltage controlled oscillator 83 of the signal generator 8. Accordingly, the frequency of the reference signal Ss output from the voltage controlled oscillator 83 can be changed to correct the frequency of the reference signal Ss to a target frequency. The frequency of the drive signal Sd can also be corrected to a target frequency.

The target phase difference $\alpha_{m1}$ can be determined based on, for example, a relationship of the phase difference between the drive signal Sd and the output signal Sm in the resonator device 30 that vibrates at a mechanical resonance frequency. Specifically, it is known that in such a resonator device 30, the phase of the output signal Sm is delayed by about 90 [deg] with respect to the input drive signal Sd. In addition, in a process until the output signal Sm is input to the correction processing unit 85, a phase delay δ [deg] may occur. In consideration of these, the target phase difference $\alpha_{m1}$ can be, for example, 90+δ [deg]. The phase delay δ can be obtained by experiments or simulations.

When a temperature change or the like occurs, the mechanical resonance frequency may change, and the efficiency of converting the input power of the resonator device 30 into vibration may change. When the conversion efficiency changes, the amplitude of the vibration of the resonator device 30 changes. Therefore, in the correction processing, first, the frequency of the reference signal Ss and the frequency of the drive signal Sd are preferentially corrected. Thereafter, the amplitude of the drive signal Sd is corrected as necessary. By executing the correction processing in such an order, the frequency and the amplitude can be efficiently controlled to target values.

In view of the control in the frequency setting unit 859 described above, it is desirable to converge the control of the signal input to the amplitude gain setting unit 858 earlier than the control of the signal input to the frequency setting unit 859. Accordingly, instability of the target control value in the frequency setting unit 859 is prevented, and thus instability of the correction processing can be prevented.

The amplitude gain setting unit 858 and the frequency setting unit 859 are respectively constructed by combining operational amplifiers and the like so as to perform, for example, a feedback control operation such as PID control. In this case, in order to converge the control of the signal input to the amplitude gain setting unit 858 earlier than the control of the signal input to the frequency setting unit 859, a crossing frequency of an open-loop transfer function of a control loop in the operation of the amplitude gain setting unit 858 may be set higher than a crossing frequency of an open-loop transfer function of a control loop in the operation of the frequency setting unit 859.

By performing the correction processing as described above, the following effects are obtained.

When the mechanical resonance frequency of the resonator device 30 changes under the influence of disturbance such as an ambient temperature change, a gravity change, vibration, and noise, the frequency and amplitude of the vibration of the resonator device 30 change, and the S/N ratio of the modulation signal decreases. Accordingly, the demodulation accuracy of the displacement signal of the movable mirror 33 decreases.

On the other hand, by performing the correction processing as described above, the frequency and the amplitude of the vibration of the resonator device 30 can be maintained constant even when disturbance such as a temperature change is applied. That is, even when disturbance such as a temperature change is applied, the frequency and the amplitude of the vibration of the resonator device 30 can be corrected so as not to change. Accordingly, a decrease in S/N ratio of the second modulation signal can be prevented. As a result, even when disturbance such as a temperature change is applied, the accuracy of the preprocessing and the demodulation processing in the calculation device 7 can be improved, and the measurement error Δd of the position of the movable mirror 33 can be reduced.

Unlike the driving by the oscillation circuit, even when the mechanical resonance frequency changes due to disturbance such as a temperature change, the frequency of the drive signal Sd can be made to follow the change, and thus the resonator device 30 can be continuously driven near the mechanical resonance frequency of the resonator device 30. Accordingly, the driving efficiency of the resonator device 30 increases, so that the power consumption of the optical device 1 can be reduced.

7.2. Calculation Device

Next, the calculation device 7 shown in FIG. 13 will be described.

The calculation device 7 shown in FIG. 13 includes the movable mirror position calculation unit 72, the measurement light intensity calculator 74, and the Fourier transformer 76. Further, the movable mirror position calculation unit 72 includes the preprocessing unit 722, an orthogonal signal generator 723, the demodulation processing unit 724, and the movable mirror position signal output unit 726.

The orthogonal signal generator 723 has a function of generating a cosine wave signal and a sine wave signal, which are waveforms orthogonal to each other, based on the reference signal Ss output from the signal generator 8 and the signal output from the preprocessing unit 722. In the following description, the cosine wave signal and the sine wave signal are also collectively referred to as an orthogonal signal. The generated orthogonal signal is used for demodulation processing in the demodulation processing unit 724. Further, the cosine wave signal is fed back to the preprocessing unit 722 to adjust the phase of the signal output from the preprocessing unit 722. Accordingly, a decrease in accuracy of the demodulation processing due to the phase shift can be prevented, and the measurement error Δd of the position of the movable mirror 33 can be reduced.

The orthogonal signal generator 723 may be provided as necessary, and may be omitted. In this case, the reference signal Ss and the signal obtained by shifting the phase of the reference signal Ss by π/2 may be used as the orthogonal signals.

8. Seventh Modification of First Embodiment

Next, a spectroscopy apparatus according to a seventh modification of the first embodiment will be described.

Figure 16:
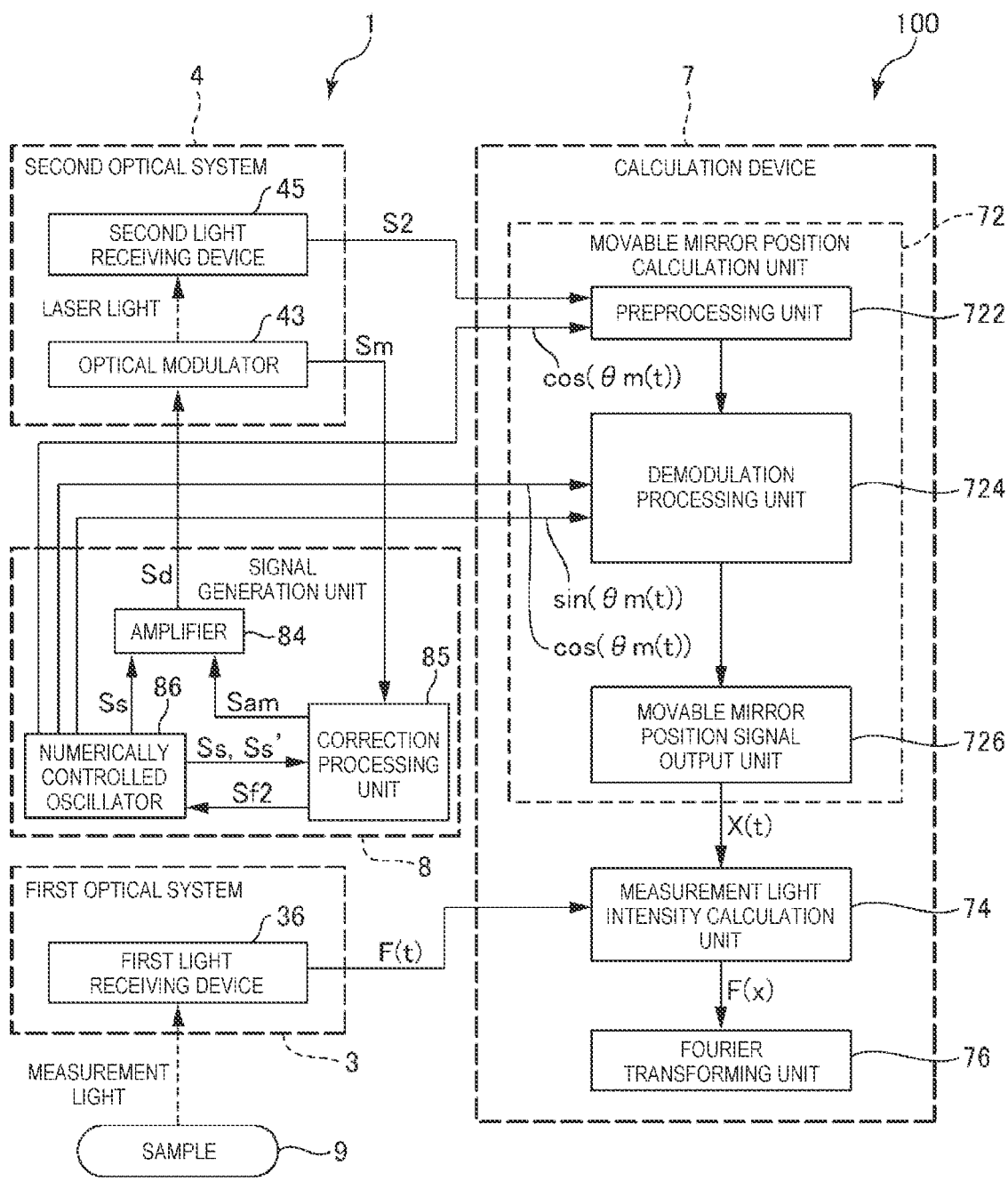
FIG. 16 is a schematic diagram showing main parts of a first optical system, a second optical system, a signal generator, and a calculation device provided in a spectroscopy apparatus according to a seventh modification of the first embodiment.
Figure 17:
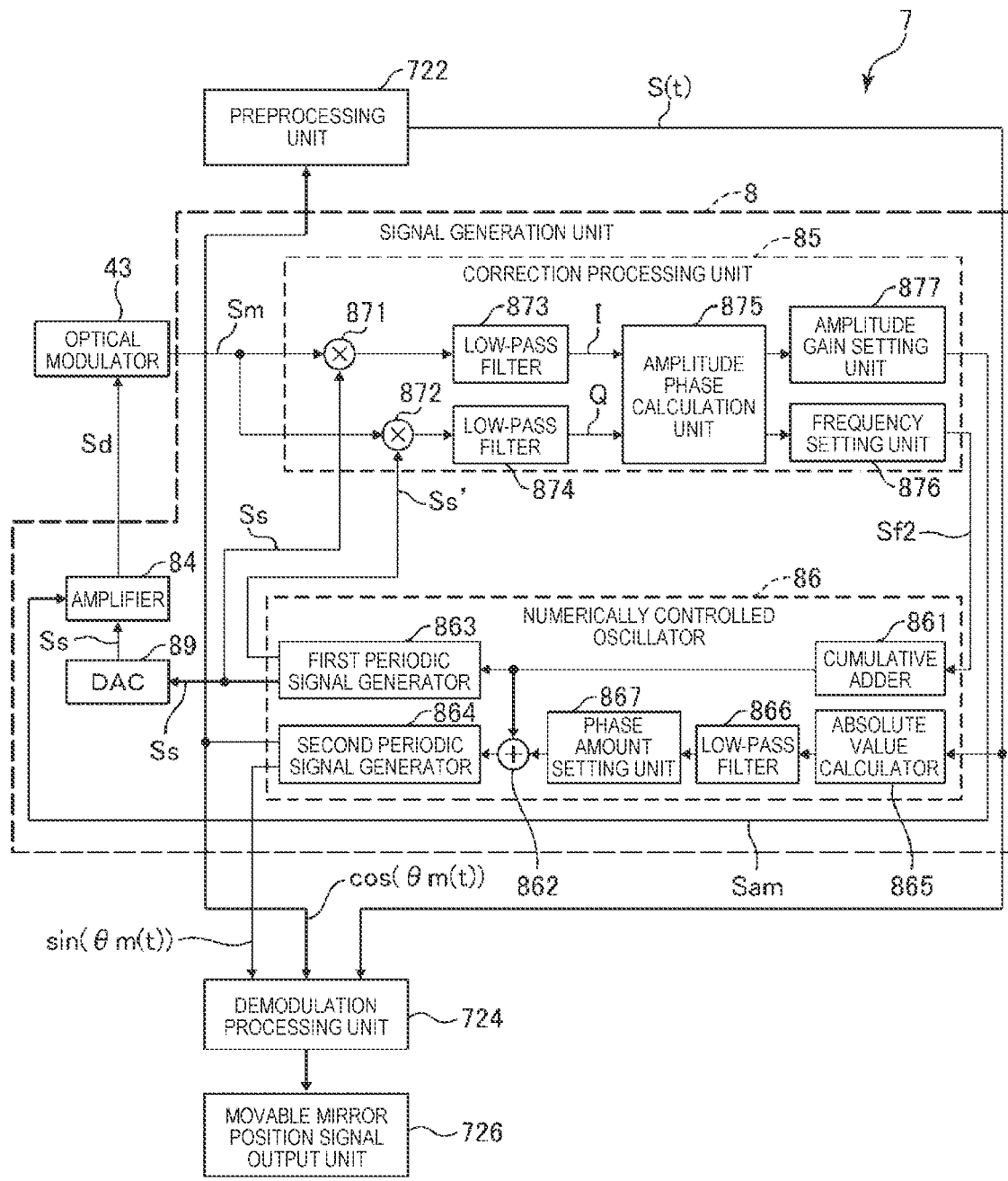
FIG. 17 is a diagram showing details of the signal generator in the schematic diagram shown in FIG. 16.

FIG. 16 is a schematic diagram showing main parts of the first optical system 3, the second optical system 4, the signal generator 8, and the calculation device 7 provided in the spectroscopy apparatus according to the seventh modification of the first embodiment. FIG. 17 is a diagram showing details of the signal generator 8 in the schematic diagram shown in FIG. 16.

The spectroscopy apparatus 100 shown in FIG. 16 is the same as the spectroscopy apparatus 100 shown in FIG. 2 except that a configuration of the signal generator 8 is different.

In the modification, as shown in FIG. 16, the signal generator 8 includes a numerically controlled oscillator 86, the amplifier 84, and the correction processing unit 85. As shown in FIG. 17, the correction processing unit 85 includes multipliers 871 and 872, a low-pass filter 873, a low-pass filter 874, an amplitude phase calculation unit 875, a frequency setting unit 876, and an amplitude gain setting unit 877.

8.1. Signal Generator

The signal generator 8 shown in FIG. 17 will be described.

The numerically controlled oscillator 86 generates a periodic signal such as a sine wave or a cosine wave by reading, from a ROM table that stores numerical values of a sine wave and a cosine wave for one period, address data added at regular clock intervals. Accordingly, the numerically controlled oscillator 86 generates the reference signal Ss having a target frequency with high accuracy and outputs the reference signal Ss to a DAC 89. The DAC 89 is a digital-to-analog converter, and generates an analog reference signal Ss based on the input digital reference signal Ss.

The numerically controlled oscillator 86 includes a cumulative adder 861, an absolute value calculator 865, a low-pass filter 866, a phase amount setting unit 867, an adder 862, a first periodic signal generator 863, and a second periodic signal generator 864.

The cumulative adder 861 cumulatively adds a frequency control signal Sf2 output from the frequency setting unit 876 of the correction processing unit 85. As will be described later, the frequency control signal Sf2 is a phase lead amount per unit time step, which corresponds to a frequency to be set in the reference signal Ss. The cumulative adder 861 cumulatively adds the phase lead amount to calculate a cumulative addition value. The obtained cumulative addition value is output to the first periodic signal generator 863.

The first periodic signal generator 863 includes a read only memory (ROM) that stores numerical values of a sine wave and a cosine wave for one period. In the first periodic signal generator 863, an address numerical value corresponding to the cumulative addition value is read. Accordingly, a sine wave signal and a cosine wave signal having a frequency corresponding to the frequency control signal Sf2 can be generated. The cosine wave signal is separately output as the reference signal Ss to the DAC 89 and the multiplier 871 of the correction processing unit 85. The sine wave signal is output as a reference signal Ss' to the multiplier 872 of the correction processing unit 85.

The absolute value calculator 865 calculates an absolute value of the preprocessed signal S(t) output from the preprocessing unit 722. The calculation result is input to the phase amount setting unit 867 via the low-pass filter 866.

As described above, the phase amount setting unit 867 sets a phase amount a to be added to the cumulative addition value by the adder 862. The adder 862 calculates a sum of the cumulative addition value and the phase amount a. The sum of the obtained cumulative addition value and the phase amount a is output to the second periodic signal generator 864.

The second periodic signal generator 864 includes a read only memory (ROM) that stores numerical values of a sine wave and a cosine wave for one period. In the second periodic signal generator 864, an address numerical value corresponding to the sum of the cumulative addition value and the phase amount a is read. Accordingly, a sine wave signal $\sin(\theta_m(t))$ and a cosine wave signal $\cos(\theta_m(t))$ to which a phase offset of the phase amount a is added can be generated at a frequency corresponding to the frequency control signal Sf2. The cosine wave signal $\cos(\theta_m(t))$ is output to the preprocessing unit 722 and the demodulation processing unit 724 to be described later, and the sine wave signal $\sin(\theta_m(t))$ is output to the demodulation processing unit 724.

Although the configuration example of the numerically controlled oscillator 86 has been described above, the configuration of the numerically controlled oscillator 86 is not limited thereto.

8.2. Correction Processing Unit

As shown in FIG. 16, the output signal Sm output in response to the driving of the optical modulator 43 is input to the correction processing unit 85. The correction processing unit 85 acquires, by orthogonal detection, a phase difference between the output signal Sm and the reference signal Ss and an amplitude of the output signal Sm.

The correction processing unit 85 has a function of outputting the frequency control signal Sf2 (a correction signal) to the numerically controlled oscillator 86 and a function of outputting the amplification factor control signal Sam (a correction signal) to the amplifier 84.

The output signal Sm from the optical modulator 43 is converted into a digital signal and then split into two signals as shown in FIG. 17. One output signal Sm is multiplied by the reference signal Ss by the multiplier 871. The signal output from the multiplier 871 passes through the low-pass filter 873, and is thus input as a signal I to the amplitude phase calculation unit 875. The other one output signal Sm is multiplied by the reference signal Ss' by the multiplier 872. The signal output from the multiplier 872 passes through the low-pass filter 874, and is thus input as a signal Q to the amplitude phase calculation unit 875.

A transmission frequency band of each of the low-pass filter 873 and the low-pass filter 874 is preferably a band in which a frequency equal to or higher than the frequency of the drive signal Sd can be removed.

The amplitude phase calculation unit 875 performs an a tan(Q/I) calculation to calculate a phase of the output signal Sm. The amplitude phase calculation unit 875 outputs the phase difference between the output signal Sm and the reference signal Ss to the frequency setting unit 876. The amplitude phase calculation unit 875 performs a $(I^2+Q^2)^{1/2}$ calculation to calculate the amplitude of the output signal Sm. The amplitude phase calculation unit 875 outputs the calculated amplitude to the amplitude gain setting unit 877. For example, a coordinate rotation digital computer (CORDIC), which is a demodulation circuit, is used as the amplitude phase calculation unit 875, but the amplitude phase calculation unit 875 is not limited thereto.

The frequency setting unit 876 has a function of obtaining a target frequency of the reference signal Ss. Then, the frequency setting unit 876 controls the frequency control signal Sf2 such that the frequency of the reference signal Ss is the target frequency, and outputs the frequency control signal Sf2 to the numerically controlled oscillator 86.

The numerically controlled oscillator 86 generates the reference signal Ss based on the frequency control signal Sf2. Accordingly, the frequency of the reference signal Ss is corrected.

The amplitude gain setting unit 877 has a function of obtaining a target amplitude of the drive signal Sd. Then, the amplitude gain setting unit 877 controls the amplification factor control signal Sam such that the amplitude of the drive signal Sd is the target amplitude, and outputs the amplification factor control signal Sam to the amplifier 84.

The amplifier 84 amplifies the amplitude of the drive signal Sd based on the amplification factor control signal Sam. Accordingly, the amplitude of the drive signal Sd is corrected.

By performing the correction processing as described above, the following effects are obtained.

Even when disturbance such as a temperature change is applied, the frequency and the amplitude of the drive signal Sd can be made to follow the change in the mechanical resonance frequency and the vibration amplitude of the resonator device 30. Accordingly, the frequency and amplitude of the vibration of the resonator device 30 can be maintained constant. As a result, a decrease in S/N ratio of a second modulation signal can be prevented. As a result, even when disturbance is applied, the measurement error Δd of the position of the movable mirror 33 can be reduced.

Unlike the driving by the oscillation circuit, the resonator device 30 can be driven near the mechanical resonance frequency of the resonator device 30, and thus the power consumption of the optical device 1 can be reduced.

In the embodiment, the correction processing unit 85 acquires, by orthogonal detection, the phase difference between the output signal Sm and the reference signal Ss and the amplitude of the output signal Sm. According to the orthogonal detection, the phase difference and the amplitude can be instantaneously acquired. Therefore, the correction processing can be performed in real time.

In the embodiment, the signal generator 8 includes the numerically controlled oscillator 86. The numerically controlled oscillator 86 can generate a periodic signal based on the numerical value read from the ROM table. Therefore, the numerically controlled oscillator 86 can output the reference signals Ss and Ss', the cosine wave signal $\cos(\theta_m(t))$, and the sine wave signal $\sin(\theta_m(t))$ with high accuracy without being influenced by noise or the like. Accordingly, the accuracy of the preprocessing and the demodulation processing in the calculation device 7 can be particularly improved.

9. Second Embodiment

Next, a spectroscopy apparatus according to a second embodiment will be described.

Figure 18:
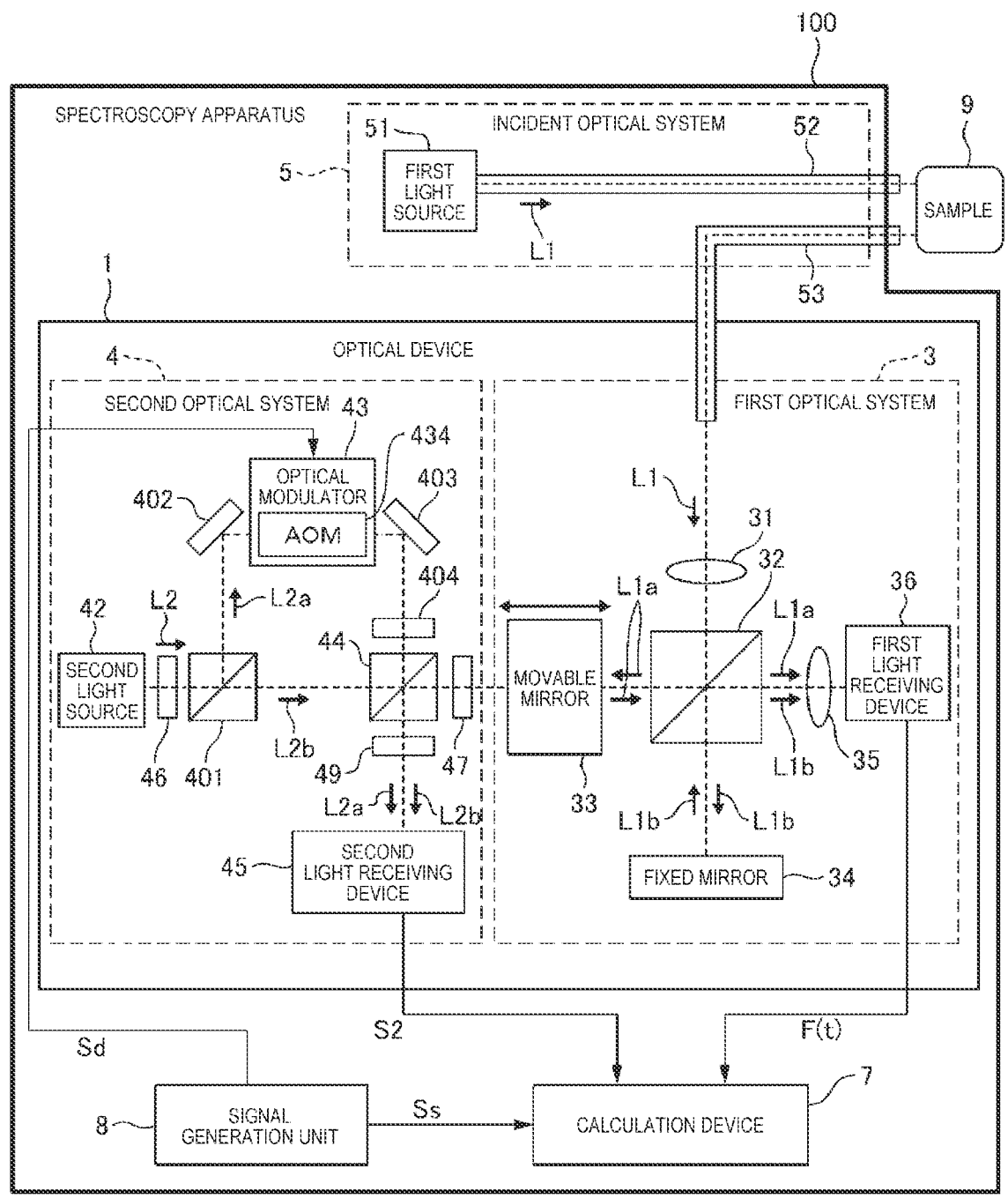
FIG. 18 is a schematic configuration diagram showing a schematic configuration of a spectroscopy apparatus according to a second embodiment.

FIG. 18 is a schematic configuration diagram showing a schematic configuration of the spectroscopy apparatus 100 according to the second embodiment.

Hereinafter, the second embodiment will be described, and in the following description, differences from the first embodiment will be mainly described, and description of similar matters will be omitted.

The spectroscopy apparatus 100 shown in FIG. 18 is the same as the spectroscopy apparatus 100 shown in FIG. 1 except that a configuration of the second optical system 4 is different.

The second optical system 4 shown in FIG. 18 is a Mach-Zehnder type interference optical system, and includes the second light source 42, the optical modulator 43, the beam splitter 44 (a second light splitting device), the second light receiving device 45, the half-wavelength plate 46, the quarter-wavelength plate 47, and the analyzer 49. The second optical system 4 further includes a beam splitter 401 (a second light splitting device), mirrors 402 and 403, and a half-wavelength plate 404.

The laser light L2 emitted from the second light source 42 passes through the half-wavelength plate 46, and is then split into two light beams including P-polarized light and S-polarized light by the beam splitter 401.

The laser light L2a, which is the S-polarized light, is reflected by the beam splitter 401, passes through the mirror 402, the optical modulator 43, the mirror 403, and the half-wavelength plate 404, and enters the beam splitter 44 as the P-polarized light. The optical modulator 43 includes an acousto-optic modulator 434 (AOM) (not shown) When the laser light L2a passes through the acousto-optic modulator 434, the frequency is shifted. Accordingly, the optical modulator 43 adds a second modulation signal to the laser light L2a. Thereafter, the laser light L2a is transmitted through the beam splitter 44 and enters the second light receiving device 45 via the analyzer 49.

The laser light L2b, which is the P-polarized light, is transmitted through the beam splitter 401 and enters the beam splitter 44. The laser light L2b is transmitted through the beam splitter 44 and enters the movable mirror 33 via the quarter-wavelength plate 47. The movable mirror 33 shifts a frequency by reflecting the laser light L2b. Accordingly, the movable mirror 33 adds a displacement signal derived from a movement of the movable mirror 33 to the laser light L2b. Thereafter, the laser light L2b reflected by the movable mirror 33 passes through the quarter-wavelength plate 47, is reflected by the beam splitter 44 as the S-polarized light, and enters the second light receiving device 45 via the analyzer 49.

In the second embodiment, the same effects as those of the first embodiment can be obtained. Instead of the acousto-optic modulator 434, an electro-optic modulator (EOM) may be used.

10. Effects of Embodiments

As described above, the optical device 1 according to the embodiments includes the first optical system 3 and the second optical system 4.

The first optical system 3 includes the beam splitter 32 (a first light splitting device), the movable mirror 33 (a first mirror), the fixed mirror 34 (a second mirror), and the first light receiving device 36. The beam splitter 32 splits the measurement light L1 emitted from the first light source 51 into one and the other one, and then mixes first measurement light L1a and the second measurement light L1b. The movable mirror 33 adds a first modulation signal to the first measurement light L1a by being moved with respect to the beam splitter 32 in an entering direction of the first measurement light L1a and reflecting the first measurement light L1a. The fixed mirror 34 reflects the second measurement light L1b. The first light receiving device 36 receives the measurement light L1a and the measurement light L1b including a sample-derived signal generated by an action between the measurement light and the sample 9 and the first modulation signal, and outputs the first light receiving signal F(t).

The second optical system 4 includes the second light source 42, the optical modulator 43, and the second light receiving device 45. The second light source 42 emits the laser light L2. The optical modulator 43 is driven based on the drive signal Sd and adds a second modulation signal to the laser light L2. The second light receiving device 45 receives the laser light L2a and the laser light L2b including a displacement signal generated by reflection on the movable mirror 33 and the second modulation signal, and outputs the second light receiving signal S2.

According to such a configuration, the position of the movable mirror 33 can be captured at an interval sufficiently narrower than a wavelength of the laser light L2 by the laser interferometer technique. Therefore, the intensity of the first light receiving signal F(t) can be sampled at an interval smaller than that in the related art, and the optical device 1 capable of generating the interferogram F(x) having high positional resolution can be obtained. Accordingly, the spectral information having high wavenumber resolution or wavelength resolution can be obtained.

Further, since the measurement interval of the position of the movable mirror 33 can be made smaller, the maximum measurement wavenumber in the spectral information can be made larger and the minimum measurement wavelength in the spectral information can be made shorter. Accordingly, the optical device 1 can contribute to implementation of the spectroscopy apparatus 100 capable of acquiring spectral information in a wider band.

In the optical device 1, the optical modulator 43 preferably includes the resonator device 30. The resonator device 30 is a device that vibrates based on the drive signal Sd. The optical modulator 43 adds the second modulation signal by reflecting the laser light L2a by the vibrating resonator device 30.

According to such a configuration, the size, weight, and power consumption of the optical device 1 can be reduced.

Therefore, the optical device 1 and the spectroscopy apparatus 100 having excellent portability can be implemented.

In the optical device 1, the resonator device 30 is preferably a crystal resonator, a silicon resonator, or a ceramic resonator. Unlike other resonators such as a piezo device, the resonators are a resonator using a resonance phenomenon, and thus have a high Q value and can easily stabilize a natural frequency. Therefore, the S/N ratio of the second modulation signal can be increased.

In the optical device 1, a moving distance of the movable mirror 33 (the first mirror) is preferably 200 mm or less. Accordingly, the measurement error $\Delta d$ of the movable mirror 33 can be particularly made smaller. As a result, the optical device 1 capable of generating an interferogram having a wider band with higher resolution can be implemented.

In the optical device 1, the second optical system 4 preferably includes the beam splitter 44 (a second light splitting device). The beam splitter 44 splits the laser beam L2, then mixes the split laser light L2a and the laser light L2b, and causes the mixed laser light L2a and L2b to enter the second light receiving device 45. It is preferable that |Ls−Lref|≤100 mm, where Lref is an optical path length between the beam splitter 44 and the optical modulator 43 and Ls is an optical path length between the beam splitter 44 and the movable mirror 33.

Accordingly, the measurement error $\Delta d$ of the position of the movable mirror 33 can be reduced to 1 nm order or less. Accordingly, the optical device 1 capable of generating an interferogram having a wider band with higher resolution can be implemented.

In the optical device 1, when the measurement light L1 is light having a first wavelength, the first optical system 3 preferably includes the light-attenuating filter 66 that attenuates the light having the first wavelength.

Accordingly, since the light having the first wavelength is prevented from entering the second light receiving device 45, the second light receiving device 45 can output a second light receiving signal having a high S/N ratio even when the intensity of the light including the sample-derived signal is weak.

A wavelength of the measurement light L1 may be 100 nm or more and less than 760 nm. In this case, the optical device 1 can be used in the spectroscopy apparatus 100 capable of performing ultraviolet spectroscopic analysis or visible light spectroscopic analysis.

The wavelength of the measurement light L1 may be 760 nm or more and 20 μm or less. In this case, the optical device 1 can be used in the spectroscopy apparatus 100 capable of performing infrared spectroscopic analysis or near-infrared spectroscopic analysis.

The first optical system 3 may further include the first light source 51. Accordingly, connection work between the optical device 1 and the first light source 51 described above is not necessary, and thus a spectroscopy apparatus excellent in operability and portability can be implemented.

The spectroscopy apparatus 100 according to the embodiments includes the optical device 1 according to the embodiments, the signal generator 8, the movable mirror position calculation unit 72, the measurement light intensity calculator 74, and the Fourier transformer 76. The signal generator 8 outputs the drive signal Sd and the reference signal Ss. The movable mirror position calculation unit 72 generates the movable mirror position signal X(t) indicating the position of the movable mirror 33 (the first mirror) by performing a calculation on the second light reception signal based on the reference signal Ss. The measurement light intensity calculator 74 generates a waveform (the interferogram F(x)) representing an intensity of the first light receiving signal F(t) at respective positions of the movable mirror 33 based on the first light receiving signal F(t) and the movable mirror position signal X(t). The Fourier transformer 76 performs Fourier transforming on the interferogram F(x) to acquire the spectral information.

According to such a configuration, the position of the movable mirror 33 can be captured at an interval sufficiently narrower than a wavelength of the laser light L2 by the the laser interferometer technique. Therefore, the intensity of the first light receiving signal F(t) can be sampled at an interval smaller than that in the related art, and an interferogram having high resolution in a wide band can be generated. Accordingly, the spectroscopy apparatus 100 capable of acquiring spectral information having high resolution in a wide band can be implemented.

In the spectroscopy apparatus 100, the optical modulator 43 preferably includes the resonator device 30. The resonator device 30 is a device that vibrates based on the drive signal Sd. When the optical modulator 43 is configured to add the second modulation signal by reflecting the laser light L2 by the vibrating resonator device 30, the signal generator 8 may include the oscillation circuit 81 that operates using the resonator device 30 as a signal source.

According to such a configuration, the size, weight, and power consumption of the optical device 1 can be reduced. Therefore, the spectroscopy apparatus 100 excellent in portability can be implemented.

In the spectroscopy apparatus 100, the drive signal Sd and the reference signal Ss are generated by the oscillation circuit 81, so that when the signals are subjected to disturbance, the signals will be affected in the same way. Therefore, the reference signal Ss and the displacement signal corresponding to the position of the movable mirror 33 and added via the optical modulator 43 that is driven based on the drive signal Sd are also affected in the same way. Therefore, when the displacement signal and the reference signal Ss are subjected to calculation in the calculation device 7, the influence of disturbance included in both can be balanced out or reduced in the process of calculation. As a result, in the calculation device 7, the position of the movable mirror 33 can be accurately obtained even under disturbance, and thus the spectroscopy apparatus 100 having more excellent robustness can be implemented.

Although the optical device and the spectroscopy apparatus according to the present disclosure have been described based on the embodiments shown in the drawings, the optical device and the spectroscopy apparatus according to the present disclosure are not limited to the embodiments and the modifications thereof. The configuration of each unit may be replaced with any configuration having the same function, or any other component may be added. For example, the spectroscopy apparatus according to the present disclosure may include a control device that controls operations of the first light source, the second light source, the signal generator, the calculation device, and the like.

The optical device and the spectroscopy apparatus according to the present disclosure may include two or more of the above-described embodiments and modifications thereof. Further, each functional unit provided in the optical device or the spectroscopy apparatus according to the present disclosure may be divided into a plurality of elements, or the plurality of functional units may be integrated into one.

Although the first optical system is a so-called Michelson type interference optical system in the above-described embodiments and modifications, the first optical system may be another type of interference optical system.

Further, the arrangement of the sample is not limited to the shown arrangement. Since the sample-derived signal is generated by the action between the sample and the measurement light, the measurement light can act on the sample by disposing the sample at any position on a first light source side of the beam splitter of the first optical system or on a first light receiving device side of the beam splitter.

What is claimed is:

1. An optical device comprising:
a first optical system; and
a second optical system, wherein
the first optical system includes
a first light splitting device configured to split measurement light emitted from a first light source into a first measurement light and a second measurement light and then mix the first measurement light and the second measurement light,
a first mirror configured to add a first modulation signal to the first measurement light by being moved with respect to the first light splitting device in an entering direction of the first measurement light and reflecting the first measurement light,
a second mirror configured to reflect the second measurement light, and
a first light receiving device configured to receive the measurement light including a sample-derived signal derived from a sample and the first modulation signal and output a first light receiving signal, and
the second optical system includes
a second light source configured to emit laser light,
an optical modulator configured to add a second modulation signal to the laser light, and
a second light receiving device configured to receive the laser light including a displacement signal generated by reflection on the first mirror and the second modulation signal and output a second light receiving signal.

2. The optical device according to claim 1, wherein the optical modulator includes a resonator device that adds the second modulation signal by reflecting the laser light.

3. The optical device according to claim 2, wherein the resonator device is a crystal resonator, a silicon resonator, or a ceramic resonator.

4. The optical device according to claim 2, wherein a moving distance of the first mirror is 200 mm or less.

5. The optical device according to claim 2, wherein the second optical system includes a second light splitting device configured to split the laser light, then mix the split laser light, and cause the mixed laser light to enter the second light receiving device, and $|Ls-Lref| \leq 100$ mm, where Lref is an optical path length between the second light splitting device and the optical modulator, and Ls is an optical path length between the second light splitting device and the first mirror.

6. The optical device according to claim 2, wherein the measurement light includes light having a first wavelength, and the first optical system includes a light-attenuating filter configured to attenuate the light having the first wavelength.

7. The optical device according to claim 2, wherein a wavelength of the measurement light is 100 nm or more and less than 760 nm.

8. The optical device according to claim 2, wherein a wavelength of the measurement light is 760 nm or more and 20 μm or less.

9. A spectroscopy apparatus comprising:
the optical device according to claim 2;
a signal generator configured to output a drive signal and a reference signal;
a movable mirror position calculation unit configured to generate a movable mirror position signal indicating a position of the first mirror by performing a calculation on the second light receiving signal based on the reference signal;
a measurement light intensity calculator configured to generate a waveform representing an intensity of the first light receiving signal at respective positions of the first mirror based on the first light receiving signal and the movable mirror position signal; and
a Fourier transformer configured to perform Fourier transforming on the waveform to acquire spectral information.

10. The spectroscopy apparatus according to claim 9, wherein
the optical modulator includes a resonator device that adds the second modulation signal by reflecting the laser light with the vibrating resonator device, and
the signal generator includes an oscillation circuit that operates using the resonator device as a signal source.

11. The optical device according to claim 1, wherein a moving distance of the first mirror is 200 mm or less.

12. The optical device according to claim 1, wherein
the second optical system includes a second light splitting device configured to split the laser light, then mix the split laser light, and cause the mixed laser light to enter the second light receiving device, and
|Ls−Lref|≤100 mm, where Lref is an optical path length between the second light splitting device and the optical modulator, and Ls is an optical path length between the second light splitting device and the first mirror.

13. The optical device according to claim 1, wherein
the measurement light includes light having a first wavelength, and
the first optical system includes a light-attenuating filter configured to attenuate the light having the first wavelength.

14. The optical device according to claim 1, wherein a wavelength of the measurement light is 100 nm or more and less than 760 nm.

15. The optical device according to claim 1, wherein a wavelength of the measurement light is 760 nm or more and 20 μm or less.

16. A spectroscopy apparatus comprising:
the optical device according to claim 1;
a signal generator configured to output a drive signal and a reference signal;
a movable mirror position calculation unit configured to generate a movable mirror position signal indicating a position of the first mirror by performing a calculation on the second light receiving signal based on the reference signal;
a measurement light intensity calculator configured to generate a waveform representing an intensity of the first light receiving signal at respective positions of the first mirror based on the first light receiving signal and the movable mirror position signal; and
a Fourier transformer configured to perform Fourier transforming on the waveform to acquire spectral information.

17. The spectroscopy apparatus according to claim 9, wherein
the optical modulator includes a resonator device that adds the second modulation signal by reflecting the laser light with the vibrating resonator device, and
the signal generator includes an oscillation circuit that operates using the resonator device as a signal source.

* * * * *